(12) United States Patent
Cho et al.

(10) Patent No.: US 10,341,004 B2
(45) Date of Patent: Jul. 2, 2019

(54) APPARATUS AND METHOD FOR BEAM TRAINING

(71) Applicant: Chung-Ang University Industry-Academy Cooperation Foundation, Seoul (KR)

(72) Inventors: Yong Soo Cho, Seoul (KR); Bon Woo Ku, Gyeonggi-Do (KR)

(73) Assignee: Chung-Ang University Industry—Academy Cooperation Foundation, Seoul (KR)

( * ) Notice: Subject to any disclaimer, the term of this patent is extended or adjusted under 35 U.S.C. 154(b) by 466 days.

(21) Appl. No.: 14/922,562

(22) Filed: Oct. 26, 2015

(65) Prior Publication Data

US 2016/0043781 A1 Feb. 11, 2016

Related U.S. Application Data

(63) Continuation of application No. PCT/KR2013/011417, filed on Dec. 10, 2013.

(30) Foreign Application Priority Data

Jun. 28, 2013 (KR) .................. 10-2013-0075723
Oct. 10, 2013 (KR) .................. 10-2013-0120578

(51) Int. Cl.
*H04B 7/06* (2006.01)
*H04L 5/00* (2006.01)
(Continued)

(52) U.S. Cl.
CPC ............. *H04B 7/0684* (2013.01); *H01Q 3/24* (2013.01); *H04B 7/0408* (2013.01); *H04B 7/063* (2013.01);
(Continued)

(58) Field of Classification Search
CPC .... H04B 7/0684; H04B 7/088; H04B 7/0695; H04B 7/0639; H04B 7/0634; H04B 7/063;
(Continued)

(56) References Cited

U.S. PATENT DOCUMENTS

2007/0129018 A1* 6/2007 Trainin ................ H04L 1/0027
455/69
2009/0232245 A1* 9/2009 Lakkis ................ H04L 37/0634
375/267
(Continued)

FOREIGN PATENT DOCUMENTS

KR 10-2011-0069176 A 6/2011
KR 10-2011-0129481 A 12/2011

OTHER PUBLICATIONS

P.M. Popovic, Spreading Sequences for Multicarrier CDMA Systems, IEEE Transactions on Communications, vol. 47, No. 6, p. 918-926, Jun. 1999 (Year: 1999).*
(Continued)

*Primary Examiner* — Bernarr E Gregory
*Assistant Examiner* — Fred H Mull
(74) *Attorney, Agent, or Firm* — Mintz Levin Cohn Ferris Glovsky and Popeo, P.C.; Kongsik Kim; Jhongwoo Jay Peck

(57) ABSTRACT

A system for beam training including a transmitter forming a transmission beam using a transmission array and a receiver forming a receiving beam using a receiving array is disclosed. The transmitter transmits an identifier of a transmission training beam selected from the transmission beams using a secondary synchronization signal or a common reference signal, etc. The identifier of the transmission training beam is used for the beam training.

12 Claims, 22 Drawing Sheets

(51) Int. Cl.
*H04L 27/26* (2006.01)
*H04B 7/04* (2017.01)
*H04B 7/08* (2006.01)
*H01Q 3/24* (2006.01)
*H04W 72/04* (2009.01)
*H04B 7/0408* (2017.01)

(52) U.S. Cl.
CPC ......... *H04B 7/0617* (2013.01); *H04B 7/0626* (2013.01); *H04B 7/0634* (2013.01); *H04B 7/0639* (2013.01); *H04B 7/0695* (2013.01); *H04B 7/088* (2013.01); *H04B 7/0851* (2013.01); *H04L 5/0051* (2013.01); *H04L 27/2613* (2013.01); *H04W 72/046* (2013.01)

(58) Field of Classification Search
CPC .. H04B 7/0626; H04B 7/0851; H04B 7/0617; H04B 7/0632; H04B 7/086; H04W 16/28; H04W 72/046; H04L 5/0051; H04L 1/0027
See application file for complete search history.

(56) References Cited

U.S. PATENT DOCUMENTS

| | | |
|---|---|---|
| 2010/0118839 A1 | 5/2010 | Malladi et al. |
| 2010/0214169 A1 | 8/2010 | Kafle |
| 2010/0238824 A1* | 9/2010 | Farajidana .......... H04L 37/0632 370/252 |
| 2011/0211490 A1* | 9/2011 | Nikula .................. H04B 7/086 370/252 |
| 2012/0122392 A1* | 5/2012 | Morioka ............. H04L 37/0695 455/25 |
| 2012/0257606 A1 | 10/2012 | Sampath et al. |
| 2015/0043439 A1* | 2/2015 | Sajadieh ............. H04B 7/0639 370/329 |

OTHER PUBLICATIONS

Y. Tsai et al., Orthogonal frequency division multiplexing with phase modulation and constant envelope design, IEEE Military Communications Conference, p. 1-7, 2005 (Year: 2005).*
U.S. Appl. No. 60/685,957. (Year: 2007).*

* cited by examiner

APPARATUS AND METHOD FOR BEAM TRAINING

CROSS REFERENCE TO RELATED APPLICATIONS

This application is a continuation application of International Application No. PCT/KR2013/011417 filed on Dec. 10, 2013, which claims priority to Korean Application No. 10-2013-0075723 filed on Jun. 28, 2013 and Korean Application No. 10-2013-0120578 filed on Oct. 10, 2013. The applications are incorporated herein by reference.

TECHNICAL FIELD

The present disclosure relates to a technique for training a beam in an array antenna system, more particularly relates to a technique for training rapidly a pair of optimal beams including a beam in transmitter side and a beam in receiver side.

The present disclosure relates to an apparatus and a method of transmitting an ID of a beam, more particularly relates to an apparatus and a method of transmitting an OFDM symbol including information concerning an ID of a beam so that the ID of the beam can be detected on a physical layer.

BACKGROUND ART

A radio wave in dozens of gigahertz of band which is called as millimeter wave band has high path loss, short wavelength and high straightness. Accordingly, a directional beamforming technique is introduced as a useful method for enhancement of capacity and coverage, wherein the directional beamforming technique can use effectively line of sight LOS or multipath component. An analog beamforming technique ABF has been mainly used compared with a digital beamforming technique because the analog beamforming technique is less complicated than the digital beamforming technique in view of hardware. Additionally, a switched beamforming technique has been widely used than an adaptive beamforming technique due to constraint of the ABF.

It is possible to realize a small array antenna system including many antennas in millimeter wave band because wavelength of the millimeter wave is short. In this case, the array antenna system can form many beams of which half power beam width HPBW is very small. Additionally, the array antenna system can achieve three-dimensional beamforming, which realizes both of vertical beam and horizontal beam, by using hundreds of antennas. The array antenna system can obtain considerable high gain by arraying a beam in transmitter side and a beam in receiver side, i.e. a pair of beams to realize maximum signal to noise ratio SNR.

Accordingly, it is necessary to search the optimal beams in transmitter side and receiver side (beam training) so as to achieve maximum beamforming performance. Since pairs of beams exist in multi path, it is important to search a pair of beams capable of realizing maximum beamforming performance. The beam training is generally achieved by repeating corresponding process, and thus a time proportional to multiply of a number of a beam in a transmission station and a number of a beam in a receiving station is approximately required. Specially, in the event that a lot of beams exist, much amount of time is taken for realizing the beam training. Hence, a technique for achieving the beam training in short time has been required, for the purpose of performing effective beamforming.

SUMMARY

Accordingly, the present invention is provided to substantially obviate one or more problems due to limitations and disadvantages of the background art.

One embodiment of the invention provides a method of performing rapidly synchronization and beam training between a transmitter using a transmission array and a receiver using a receiving array.

Another embodiment of the invention provides to a method of searching a pair of optimal beams between the transmitter and the receiver in a data transmission system including the transmitter using the transmission array and the receiver using the receiving array.

Still another embodiment of the invention provides to a method of transmitting an ID of a beam and detecting the transmitted ID on a physical layer.

Still another embodiment of the invention provides to a method of searching effectively the beam.

Still another embodiment of the invention provides to a method of shortening a time taken for searching the beam.

In one aspect, the present invention provides a transmitter comprising: a transmission unit configured to transmit an identifier ID of selected transmission training beam to a receiver using one or more transmission training beam selected from transmission beams capable of being formed by using a transmission array.

The receiver includes a receiving array, and the ID of the transmitted transmission training beam is used for selecting a pair of beams including a data receiving beam, used for receiving data from the transmitter to the receiver among receiving beams capable of being formed by using the receiving array, and a data transmission beam used for transmitting data from the transmitter to the receiver among the transmission beams.

The transmission unit modulates a phase of a transmission signal transmitted to the receiver according to the ID of the transmission training beam and transmits the modulated phase of the transmission signal to the receiver.

The transmission unit transmits the ID of the transmission training beam using a secondary synchronization signal SSS.

The transmission unit generates the secondary synchronization signal, interleaves the generated secondary synchronization signal, modulates a phase of the interleaved secondary synchronization signal according to the ID of the transmission training beam, and transmits the modulated secondary synchronization signal to the receiver.

The transmission unit generates the secondary synchronization signal, modulates a phase of the generated secondary synchronization signal according to the ID of the transmission training beam, interleaves the modulated secondary synchronization signal, and transmits the interleaved secondary synchronization signal to the receiver.

The transmission unit transmits the ID of the transmission training beam using a common reference signal CRS.

Plural transmission training beams are selected from the transmission beams, and the transmission unit transmits simultaneously IDs of the transmission training beams using the selected transmission training beams.

The transmission beams are arrayed in a direction where gain is maximum, and transmission beams not adjacent with each other are selected as the transmission training beam from the arrayed transmission beams.

The transmitter further comprising: a receiving unit, wherein the transmission unit transmits a transmission signal to the receiver using the transmission training beam, the receiving unit receives a channel state information generated by the receiver using the transmission signal, and determine whether or not the transmitter transmits data to the receiver using the transmission training beam according to the channel state information.

The channel state information is a signal to noise ratio SNR or a signal to interference and noise ratio SINR.

In another aspect, the present invention provides a receiver comprising: a receiving unit configured to receive an identifier of a transmission training beam, transmitted from a transmitter using one or more transmission training beam selected from transmission beams capable of being formed by using a transmission array included in the transmitter.

The receiving unit includes a receiving array and receives the identifier of the transmission training beam using one or more receiving training beam selected from receiving beams capable of being formed by the receiving array.

The identifier of the received transmission training beam is used for selecting a pair of beams including a data receiving beam, used for receiving data from the transmitter to the receiver among receiving beams capable of being formed by using the receiving array, and a data transmission beam used for transmitting data from the transmitter to the receiver among the transmission beams.

The receiver further comprising: a beam identifier detection unit configured to detect the identifier of the transmission training beam from a phase of a receiving signal received from the transmitter.

The receiving unit receives the identifier of the transmission training beam using a secondary synchronization signal SSS.

The receiver further comprising: a beam identifier detection unit, wherein a phase of the secondary synchronization signal is modulated according to the identifier of the transmission training beam, the receiving unit receives a primary synchronization signal transmitted from the transmitter using the transmission training beam, estimates a channel between the transmitter and the receiver by using the primary synchronization signal, the beam identifier detection unit obtains modulated value of the phase of the secondary synchronization signal using the estimated channel and detects the identifier of the transmission training beam from the modulated value.

The receiving unit receives the identifier of the transmission training beam using a common reference signal CRS.

The receiver further comprising: a channel state information generating unit; and a transmission unit, wherein the receiving unit receives a receiving signal transmitted from the transmitter using the transmission training beam, the channel state information generating unit generates a channel state information concerning wireless channel between the transmitter and the receiver by using the receiving signal, the transmission unit transmits the channel state information to the transmitter, and the channel state information is used for determining whether or not data is to be transmitted to the receiver using the transmission training beam.

The channel state information is a signal to noise ratio SNR or a signal to interference and noise ratio SINR.

The receiver further comprising: a beam identifier detection unit, wherein the receiving unit receives receiving signals transmitted by using transmission training beams and measures a receiving power of the receiving signals, and the receiving unit detects an identifier of a transmission training beam corresponding to a receiving signal of which the receiving power is more than a critical value.

The receiving unit receives receiving signals transmitted from the transmitter by using data transmission beams selected from the transmission training beams, combines the received receiving signals and detects data from the combined receiving signals.

The receiving unit receives first data from the transmitter using a first data transmission beam selected from the transmission training beams, and receives second data from the transmitter using a second data transmission beam selected from the transmission training beams.

In still another aspect, the present invention provides a transmitter including two dimensional transmission array having one dimensional sub arrays, the transmitter comprising: a transmission unit configured to transmit an ID of a transmission training beam, selected from transmission beams capable of being formed using a training sub array selected from the one dimensional sub arrays, and an ID of the training sub array to a receiver by using the transmission training beam, wherein the transmitted ID of the transmission training beam and the transmitted ID of the training sub array are used for selecting a pair of beams including a data transmission beam used for transmitting data from the transmitter to the receiver, among transmission beams capable of being formed by using the transmission array.

The transmitter transmission unit generates a gold sequence based on the ID of the transmission training beam and the ID of the training sub array and transmits the generated gold sequence to the receiver.

The transmission unit generates a gold sequence based on the ID of the transmission training beam, maps with certain interval the generated gold sequence in frequency domain according to the ID of the training sub array, and transmits the mapped gold sequence to the receiver.

The transmission unit generates a Chu sequence based on the ID of the transmission training beam, cyclic-shifts the generated Chu sequence in frequency domain according to the ID of the training sub array, and transmits the shifted Chu sequence to the receiver.

The transmission unit generates a Chu sequence based on the ID of the transmission training beam and the ID of the training sub array and transmits the generated Chu sequence to the receiver.

The transmission unit generates a spreading sequence by spreading a first Chu sequence generated based on the ID of the transmission training beam and the ID of the training sub array using a second Chu sequence, and transmits the generated spreading sequence to the receiver.

The transmission unit generates a spreading sequence by spreading a first m sequence generated based on the ID of the transmission training beam and the ID of the training sub array using a second m sequence and transmits the generated spreading sequence to the receiver.

In still another aspect, the present invention provides a receiver comprising: a receiving unit configured to receive an ID of a transmission training beam, transmitted using a transmission training beam selected from transmission beams capable of being formed by using a training sub array selected from one dimensional sub arrays, and an ID of the training sub array, from a transmitter including a second dimensional transmission array having the one dimensional sub arrays, wherein the transmitted ID of the transmission training beam and the transmitted ID of the training sub array are used for selecting a pair of beams including a data transmission beam used for transmitting data from the transmitter to the receiver, among transmission beams capable of being formed by using the transmission array.

The receiving unit receives a gold sequence generated based on the ID of the transmission training beam and the ID of the training sub array.

The receiving unit receives a gold sequence which is generated based on the ID of the transmission training beam and is mapped with certain interval in frequency domain according to the ID of the training sub array.

The receiving unit receives a Chu sequence which is generated based on the ID of the transmission training beam and is cyclic-shifted in frequency domain according to the ID of the training sub array.

The receiving unit receives a Chu sequence generated based on the ID of the transmission training beam and the ID of the training sub array.

The receiving unit receives a spreading sequence generated by spreading a first Chu sequence generated based on the ID of the transmission training beam and the ID of the training sub array using a second Chu sequence.

The receiving unit receives a spreading sequence generated by spreading a first m sequence generated based on the ID of the transmission training beam and the ID of the training sub array using a second m sequence.

A method according to one embodiment of the invention may perform rapidly synchronization and beam training between a transmitter using a transmission array and a receiver using a receiving array.

The method may search a pair of optimal beams between the transmitter and the receiver in a data transmission system including the transmitter using the transmission array and the receiver using the receiving array.

The method may transmit an ID of a beam and detect the transmitted ID on a physical layer.

The method may search effectively the beam.

The method may shorten a time taken for searching the beam.

BRIEF DESCRIPTION OF DRAWINGS

Example embodiments of the present invention will become more apparent by describing in detail example embodiments of the present invention with reference to the accompanying drawings, in which.

DETAILED DESCRIPTION

Hereinafter, various embodiments of the present invention will be described in detail with reference to accompanying drawings.

Figure 1:
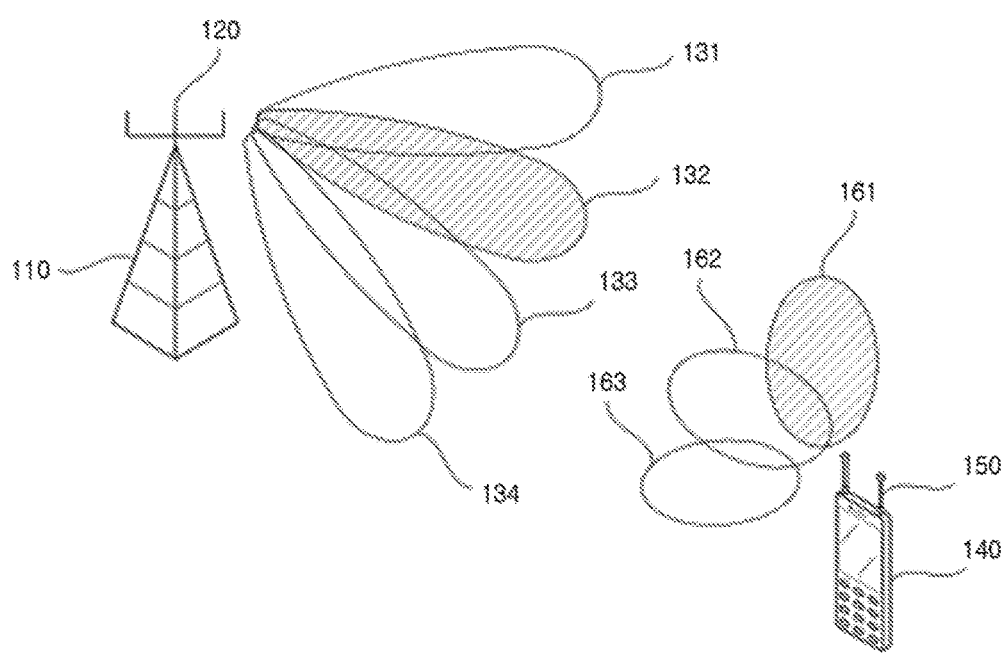
FIG. 1 is a view illustrating beam training for searching a pair of optimal beams between a transmitter using a transmission array and a receiver using a receiving array.

FIG. 1 is a view illustrating beam training for searching a pair of optimal beams between a transmitter using a transmission array and a receiver using a receiving array.

A transmitter 110 includes a transmission array 120. In one embodiment, a base station, a relay, etc. of a mobile communication system may operate as the transmitter 110 in FIG. 1. The transmission array 120 means an array antenna where antennas, etc. are combined to transmit or receive data. For example, in the transmission array 120, the antennas may be disposed in two dimensions.

The transmitter 110 may form transmission beams 131, 132, 133 and 134 by using the transmission array 120. Here, the transmission beams 131, 132, 133 and 134 may be predetermined. In one embodiment, the transmitter 110 may select at least one of the transmission beams 131, 132, 133 and 134 capable of being formed by using the transmission array 120 as a data transmission beam. The transmitter 110 may transmit data to a receiver 140 using the data transmission beam. As shown in FIG. 1, a technique for selecting the data transmission beam for transmitting the data from the predetermined transmission beams 131, 132, 133 and 134 is called as a switched beamforming technique.

The receiver 140 includes a receiving array 150. In one embodiment, a terminal of a mobile communication system, etc. may operate as the receiver 140 as shown in FIG. 1. The receiving array 150 means an array antenna where antennas, etc. are combined to transmit or receive data. For example, in the receiving array 150, the antennas may be disposed in two dimensions.

The receiver 140 may form receiving beams 161, 162 and 163 by using the receiving array 150. Here, the receiving beams 161, 162 and 163 may be predetermined. In one embodiment, the receiver 140 may select at least one of the receiving beams 161, 162 and 163 as a data receiving beam. The receiver 140 may receive data from the transmitter 110 using the data receiving beam.

Referring to the embodiment in FIG. 1, the data transmission beam and the data receiving beam for transmitting or receiving data are combined with 12 cases (four data transmission beams X three data receiving beams). In one embodiment, the transmitter 110 and the receiver 140 may determine the data transmission beam and the data receiving beam by searching in sequence every case.

For example, the transmitter 110 may transmit a transmission signal to the receiver 140 using a transmission training beam 132 selected from the transmission beams 131, 132, 133 and 134. The receiver 140 may receive the transmission signal using a receiving training beam 161 selected from the receiving beams 161, 162 and 163, generate signal to noise ratio SNR or signal to interface and noise ratio SINR about the received transmission signal, and transmit the SNR or SINR to the transmitter 110. The transmitter 110 may evaluate data transmission performance of a pair of beams including the transmission training beam 132 and the receiving training beam 161, based on the SNR or SINR, etc. transmitted from the receiver 140. In one embodiment, the transmitter 110 may evaluate data transmission performance of every pair of the beams, select a transmission beam included in the pair of beams having most excellent data transmission performance as a data transmission beam through the evaluation, and select a receiving beam included in the pair of beams having most excellent data transmission performance as a data receiving beam through evaluation.

In the event that the receiver 140 transmits or receives first data or is shifted, the transmitter 110 and the receiver 140 should search a data transmission beam and a data receiving beam capable of realizing optimal performance. However, much time is taken for searching the data transmission beam and the data receiving beam, i.e. performing the beam training process.

For example, the transmitter 110 may transmit a synchronization signal for synchronizing with the receiver 140 and then perform the beam training. In this case, since the beam training is performed after the receiver 140 is synchronized with the transmitter 110, much time is taken until the beam training is finished.

Figure 2:
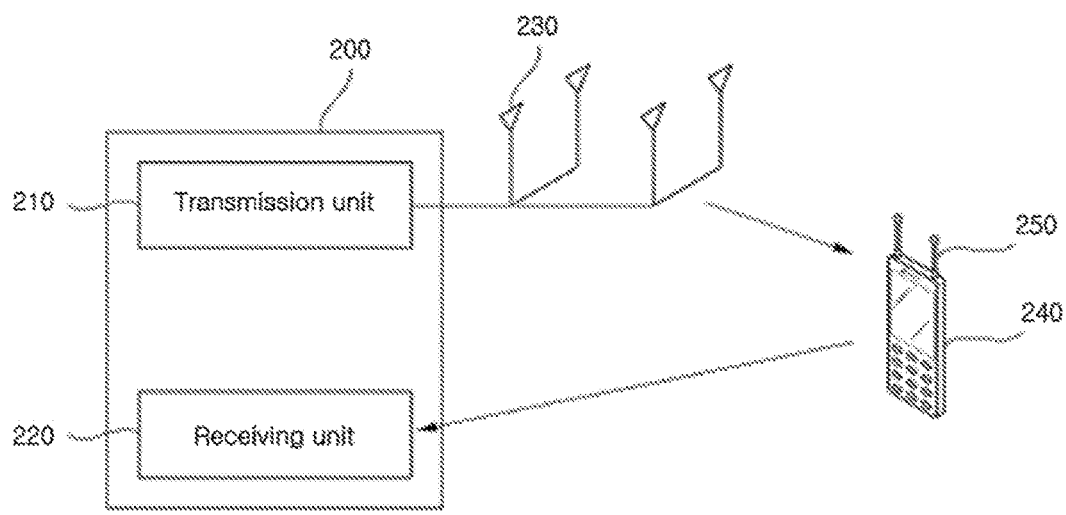
FIG. 2 is a block diagram illustrating a transmitter according to one embodiment of the invention.

FIG. 2 is a block diagram illustrating a transmitter according to one embodiment of the invention.

A transmitter 200 includes a transmission unit 210 and a receiving unit 220. The transmitter 200 may include a transmission array 230. The transmission unit 210 may form a transmission beam using the transmission array 230. In the transmission array 230, antennas may be arrayed in two dimensions. Here, shape, gain, direction, etc. of the transmission beam may be predetermined, and the transmission unit 210 may select at least one of transmission beams having predetermined shape as a data transmission beam. The data transmission beam indicates a beam used for transmitting data. The transmission unit 210 may transmit the data to a receiver 240 by using the selected data transmission beam.

In one embodiment, the transmission unit 210 may select one or more of the transmission beams as a transmission training beam. The transmission training beam means a beam used for beam training. The transmitter 200 may select the data transmission beam using the selected transmission training beam. In one aspect, the transmission unit 210 may transmit an identifier ID of the transmission training beam to the receiver 240 using the transmission training beam. In one embodiment, the transmission unit 210 may transmit the identifier ID to a physical layer. In this case, the receiver 240 may decode the identifier ID on the physical layer not an upper layer.

In one embodiment, the transmission unit 210 may modulate phase of a transmission signal transmitted from the transmitter 200 to the receiver 240 according to the identifier ID of the transmission training beam. The transmission unit 210 may transmit the transmission signal of which the phase is modulated to the receiver 240, and the receiver 240 may detect the identifier ID of the transmission training beam from the phase of the transmission signal. In an aspect, a secondary synchronization signal SSS or a common reference signal CRS may be used as the transmission signal.

Figure 3:
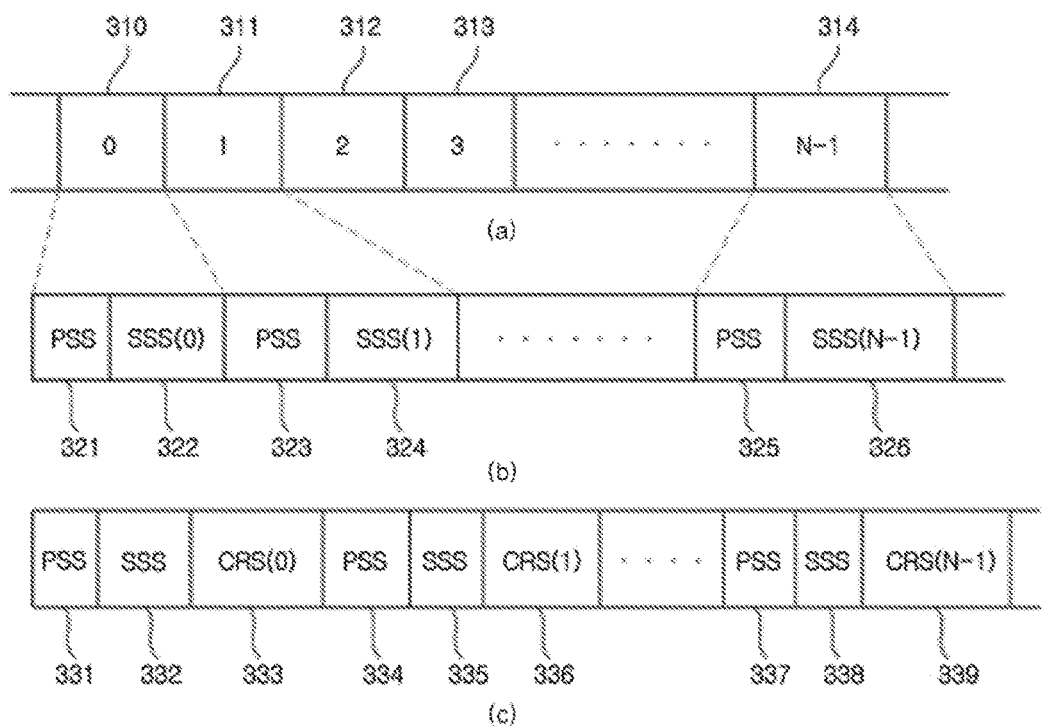
FIG. 3 is a view illustrating a frame transmitted from the transmitter to the receiver according to one embodiment of the invention.

In one embodiment, the transmission unit 210 may transmit the identifier ID of the transmission training beam using a frame shown in FIG. 3.

(a) in FIG. 3 is a view illustrating a frame transmitted from the transmitter to the receiver according to one embodiment of the invention. Numeral in each of frames 310, 311, 312, 313 and 314 indicates an identifier of a transmission training beam. In (a) of FIG. 3, the transmission unit 210 may select sequentially transmission beams as a transmission training beam depending on numerals of the transmission beams, and transmit the identifier of the selected transmission training beam using corresponding transmission training beam.

The transmitter 210 may select a transmission beam '0' of the transmission beams as the transmission training beam in a first frame 310, select a transmission beam '1' as the transmission training beam in a second frame 311, select a transmission beam '2' as the transmission training beam in a third frame 312, select a training beam '3' as the transmission training beam in a fourth frame 313, and select a training beam '(N-1)' as the transmission training beam in a Nth frame 314. The transmission unit 210 may transmit the identifier of the selected transmission training beam to the receiver 240 using the selected transmission training beam, in respective frames 310, 311, 312, 313 and 314.

The receiver 240 may detect the identifier of the transmission training beam, and generate SNR or SINR, etc. about the transmission training beam. The receiver 240 may feedback the generated SNR or SINR to the transmitter 200. The receiving unit 220 may receive the SNR or the SINR from the receiver 240, and then evaluate performance of the transmission beam selected as the transmission training beam through the received SNR or SINR. Additionally, the receiving unit 220 may select the data transmission beam based on performance of respective transmission beams.

(b) in FIG. 3 is a view illustrating a process of transmitting an identifier of a transmission training beam using a secondary synchronization signal SSS.

The first frame 310 may include a first slot 321 having a primary synchronization signal PSS and a second slot 322 having the second synchronization signal. Here, the second slot 322 is transmitted after the first slot 321 is transmitted.

Numeral in a parenthesis following the secondary synchronization signal indicates an identifier of the transmission training beam transmitted by using corresponding secondary synchronization signal.

The receiver 240 may be synchronized with the transmitter 200 by using the primary synchronization signal in the first slot 321 of the first frame 310. The receiver 240 may generate SNR or SINR, etc. about the transmission beam '0' by using the identifier of the transmission training beam included in the secondary synchronization signal in the second slot 322 of the first frame 310. The receiver 240 may feedback the generated SNR or SINR, etc. to the transmitter 200.

The receiver 240 may be synchronized with the transmitter 200 by using a primary synchronization signal in a first slot 323 of the second frame 311. The receiver 240 may generate SNR or SINR, etc. about the transmission beam '1' by using an identifier of a transmission training beam included in a secondary synchronization signal in a second slot 324 in the second frame 311, and feedback the generated SNR or SINR, etc. to the transmitter 200.

In a similar method, the receiver 240 may feedback SNR or SINR, etc. about the number transmission beam '(N−1)' to the transmitter 200 by using a primary synchronization signal included in a first slot 325 and a secondary synchronization signal included in a second slot 326 of the Nth frame 314.

(c) in FIG. 3 is a view illustrating a process of transmitting an identifier of a transmission training beam using a common reference signal.

The first frame 310 may include a first slot 331 having a primary synchronization signal PSS, a second slot 332 having a secondary synchronization signal and a third slot 333 having a common reference signal. Here, the second slot 332 is transmitted after the first slot 331 is transmitted, and the third slot 333 is transmitted after the second slot 332 is transmitted. Numeral in parenthesis following the common reference signal indicates an identifier of a transmission training beam transmitted by using corresponding common reference signal.

The receiver 240 may be synchronized with the transmitter 200 by using the primary synchronization signal included in the first slot 331 and the secondary synchronization signal included in the second slot 332 of the first frame 310. The receiver 240 may generate SNR or SINR, etc. about the transmission beam '0' by using an identifier of the transmission training beam included in the common reference signal in the third slot 333 of the first frame 310. The receiver 240 may feedback the generated SNR or SINR, etc. to the transmitter 200.

The receiver 240 may be synchronized with the transmitter 200 by using a primary synchronization signal included in a first slot 334 and a secondary synchronization signal included in a second slot 335 of the second frame 311. The receiver 240 may generate SNR or SINR, etc. about the transmission beam '1' by using an identifier of the transmission training beam included in a transmission synchronization signal in a third slot 336 of the second frame 311, and feedback the generated SNR or SINR, etc. to the transmitter 200.

In a similar method, the receiver 240 may be synchronized with the transmitter 200 by using a primary synchronization signal included in a first slot 337 and a secondary synchronization signal included in a second slot 338 of the Nth frame 314, and feedback SNR or SINR, etc. about the transmission beam '(N−1)' to the transmitter 200 by using a common reference signal in a third slot 339.

In the embodiment in FIG. 3, the receiver 240 may perform simultaneously the synchronization process and the beam training process. Accordingly, the receiver 240 may perform rapidly the beam training.

(b) in FIG. 3 shows structure of the frame for transmitting the identifier of the transmission training beam using the secondary synchronization signal. In one embodiment, the transmission unit 210 modulates the phase of the secondary synchronization signal according to the identifier of the transmission training beam and transmits the modulated secondary synchronization signal, and thus it may transmit the identifier of the transmission training beam using the secondary synchronization signal. In one aspect, the transmission unit 210 may perform interleaving about the secondary synchronization signal, and modulate a phase of the interleaved secondary synchronization signal. In another aspect, the transmission unit 210 may modulate a phase of the secondary synchronization signal, and interleave the secondary synchronization signal of which the phase is modulated.

In FIG. 3, only one symbol is included in the slot 322, 324, 326, 333, 336 or 339 for transmitting the identifier of the transmission training beam. However, respective slots 322, 324, 326, 333, 336 and 339 may include plural symbols for transmitting the identifier of the transmission training beam. Each of the symbols may be a part of the secondary synchronization signal or the common reference signal. In the event that the symbols including the identifier of the transmission training beam are transmitted, the receiver may detect more correctly the identifier of the transmission training beam by averaging the symbols.

Figure 4:
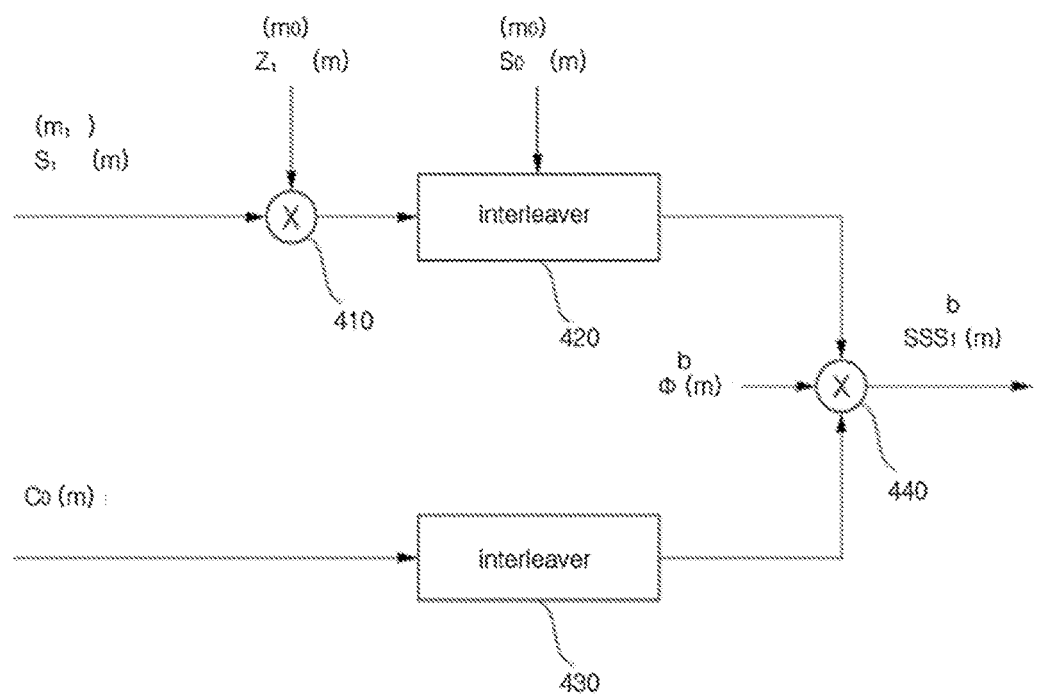
FIG. 4 is a view illustrating a process of transmitting an identifier of a transmission training beam using interleaved secondary synchronization signal.

FIG. 4 is a view illustrating a process of transmitting an identifier of a transmission training beam using interleaved secondary synchronization signal. The transmission unit 210 may transmit the identifier of the transmission training beam using multipliers 410 and 440 and interleavers 420 and 430.

In one embodiment, the transmission unit 210 may generate M sequences $s_0^{(m_0)}(n)$ and $s_1^{(m_1)}(n)$ according to an identifier $N_{ID}^{(1)}$ of a cell group including the transmitter. For example, the transmission unit 210 may generate M sequences $s_0^{(m_0)}(n)$ and $s_1^{(m_1)}(n)$ according to following equation 1 to equation 7.

$$m' = N^{(1)ID} + q(q+1)/2 \qquad \text{[Equation 1]}$$

In equation 1, $N_{ID}^{(1)}$ means the identifier of the cell group where the transmitter belongs, and q is determined according to following equation 2.

$$q = \left\lfloor \frac{N^{(1)ID} + q'(q'+1)/2}{30} \right\rfloor \qquad \text{[Equation 2]}$$

In equation 2, q' is determined according to following equation 3.

$$q' = \lfloor N^{(1)ID}/30 \rfloor \qquad \text{[Equation 3]}$$

$$m_0 = m' \bmod 31$$

$$m_1 = (m_0 + \lfloor m'/31 \rfloor + 1) \qquad \text{[Equation 4]}$$

$$s_0^{(m_0)}(n) = \bar{s}((n+m_0) \bmod 31)$$

$$s_1^{(m_1)}(n) = \bar{s}((n+m_1) \bmod 31) \qquad \text{[Equation 5]}$$

In equation 5, $\bar{s}(i)$ is determined according to following equation 6.

$$\bar{s}(i) = 1 - 2x(i), \ 0 \leq i \leq 30 \qquad \text{[Equation 6]}$$

In equation 6, $x(\bar{i}+5)$ is determined according to following equation 7.

$$x(\bar{i}+5)=(x(\bar{i}+2)+x(\bar{i})) \bmod 2, 0 \leq i \leq 25 \quad \text{[Equation 7]}$$

In equation 7, an initial value of $x(i)$ is determined to $x(0)=0$, $x(1)=0$, $x(2)=0$, $x(3)=0$ and $x(4)=1$.

The transmission unit 210 may multiply the generated M sequence $s_1^{(m_1)}(n)$ by a scrambling sequence $s_1^{(m_0)}(n)$ using the multiplier 410. The transmission unit 210 may generate the scrambling sequence $z_1^{(m_0)}(n)$ according to following equation 8 to equation 11.

$$c_0(n)=\bar{c}((n+N_{ID}^{(2)}) \bmod 31)$$

$$c_1(n)=\bar{c}((n+N_{ID}^{(2)}+3) \bmod 31) \quad \text{[Equation 8]}$$

In equation 8, $N_{ID}^{(2)}$ is an identifier of a cell group, and its value is determined to $N_{ID}^{(2)} \in 0, 1, 2$. $\bar{c}(i)$ is determined according to following equation 9.

$$\bar{c}(i)=1-2x(i), 0 \leq i \leq 30 \quad \text{[Equation 9]}$$

In equation 9, an initial value of $x(i)$ is determined to $x(0)=1$, $x(1)=0$, $x(2)=0$, $x(3)=0$ and $x(4)=1$.

$$z_1^{(m_0)}(n)=\bar{z}((n+(m_0 \bmod 8)) \bmod 31)$$

$$z_1^{(m_1)1}(n)=\bar{z}((n+(m_1 \bmod 8)) \bmod 31) \quad \text{[Equation 10]}$$

In equation 10, $\bar{z}(i)$ is determined according to following equation 11.

$$\bar{z}(i)=1-2x(i), 0 \leq i \leq 30 \quad \text{[Equation 11]}$$

In equation 11, an initial value of $x(i)$ is determined to $x(0)=0$, $x(1)=0$, $x(2)=0$, $x(3)=0$ and $x(4)=1$.

The transmission unit 210 may multiply odd component of the M sequence by the scrambling sequence generated according to equation 8 to equation 11 and multiply even component of the M sequence by the generated scrambling sequence. In one embodiment, the transmission unit 210 may multiply the odd component of the M sequence by the scrambling sequence generated according to following equation 12 and multiply the even component of the M sequence by the generated scrambling sequence.

$$SSS(k) = \begin{cases} SSS(2n) = s_0^{(m_0)}(n)c_0(n) \\ SSS(2n+1) = s_1^{(m_1)}(n)c_1(n)z_1(n) \end{cases} \quad \text{[Equation 12]}$$

In equation 12, $n=0, 1, \ldots 30$.

The transmission unit 210 may interleave a secondary synchronization signal $SSS(k)$ multiplied by the scrambling sequence using the interleavers 420 and 430. In one embodiment, the transmission unit 210 may modulate a phase of a secondary synchronization signal interleaved according to following equation 13, depending on the identifier of the transmission training beam.

$$SSS^b(k)=SSS(k)\phi^b(k) \quad \text{[Equation 13]}$$

In equation 13, $\phi^b(k)$ is determined according to following equation 14.

$$\phi^b(k) = e^{j\frac{2\pi k b \alpha}{N}} \quad \text{[Equation 14]}$$

In equation 14, k means an index of subcarrier where the secondary synchronization signal is carried, and b indicates an index of the transmission training beam. N means a number of the subcarrier where the secondary synchronization signal is carried, and α indicates a phase varying factor as a predetermined constant.

In one embodiment, the transmission unit 210 may modulate a phase of a secondary synchronization signal interleaved by using the multiplier 440 according to the identifier of the transmission training beam.

In another embodiment, the transmission unit 210 may modulate the phase of the generated secondary synchronization signal according to the identifier of the transmission training beam, interleave the modulated secondary synchronization signal, and transmit the interleaved secondary synchronization signal to the receiver. This will be described in detail with reference to accompanying drawing FIG. 5.

Figure 5:
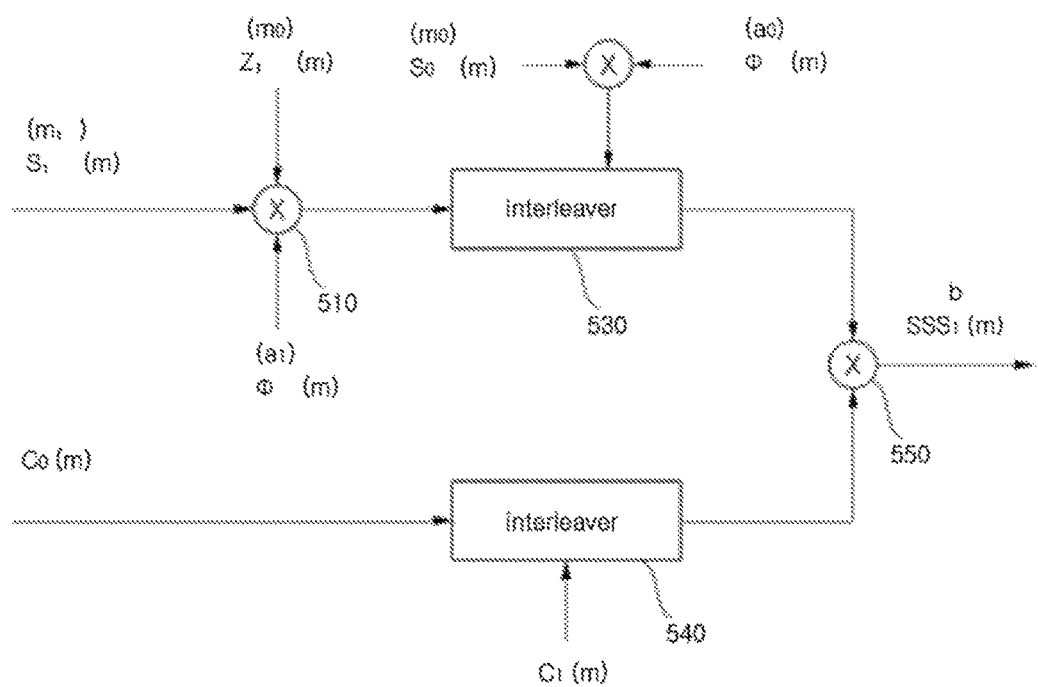
FIG. 5 is a view illustrating a process of transmitting an identifier of a transmission training beam using a secondary synchronization signal not interleaved.

FIG. 5 is a view illustrating a process of transmitting an identifier of a transmission training beam using a secondary synchronization signal not interleaved. The transmission unit 210 may transmit the identifier of the transmission training beam using multipliers 510 and 550 and interleavers 530 and 540.

The transmission unit 210 may generate the secondary synchronization signal according to following equation 15 to equation 26.

The transmission unit 210 may modulate a phase of the secondary synchronization signal not interleaved according to the identifier of the transmission training beam, based on equation 15. In one embodiment, the transmission unit 210 may modulate the phase of the secondary synchronization signal not interleaved using the multipliers 510 and 520, according to the identifier of the transmission training beam.

$$SSS^b(k) = \begin{cases} SSS(2n) = s_0^{(m_0)}(n)\phi^{(a_0)}c_0(n) \\ SSS(2n+1) = s_1^{(m_1)}(n)\phi^{(a_1)}(n)c_1(n)z_1(n) \end{cases} \quad \text{[Equation 15]}$$

In equation 15, $\phi^{(a_0)}$ and $\phi^{(a_1)}$ are determined according to following equation 16.

$$\begin{cases} \phi^{(a_0)}(k) = e^{j\frac{2\pi k a_0 \alpha}{N}} \\ \phi^{(a_1)}(k) = e^{j\frac{2\pi k (a_1-1)\alpha}{N}} \end{cases} \quad \text{[Equation 16]}$$

Here, k means an index of a subcarrier where the secondary synchronization signal is carried, and N indicates a number of the subcarrier where the secondary synchronization signal is carried. a means a phase varying factor as predetermined constant. $a_0=0, 1, \ldots N-1$ and $a_1=1, 2, \ldots N-1$. $a_0$ and $a_1$ may be generated in a similar or the same method of generating $m_0$ and $m_1$.

The transmission unit 210 may interleave the secondary synchronization signal of which the phase is modulated by using the interleavers 530 and 540, and transmit the interleaved secondary synchronization signal to the receiver.

In one embodiment, the transmission unit 210 may transmit the frame shown in (c) in FIG. 3 including the common reference signal of which phase is modulated according to equations 13 and 15.

In another embodiment, the transmission unit 210 may transmit the identifier of the transmission training beam by modulating phase of the common reference signal CRS. The common reference signal is a signal used in a process of performing channel estimation and synchronization in a 3GPP long term evolution LTE system.

In one aspect, the transmission unit 210 may generate the common reference signal using gold sequence, according to equations 17 to 20.

$$r_{l,n_t}(m) = \frac{1}{\sqrt{2}}(1 - 2_c(2m)) + j\frac{1}{\sqrt{2}}(1 - 2_c(2m + 1)) \quad \text{[Equation 17]}$$

Here, c(n) means the gold sequence, and an initial value of the gold sequence is determined according to following equation 18.

$$c_{init} = 2^{10}(7(n_s+1)+l+1)(2N_{ID}^{cell}+1)+2N_{ID}^{cell}+N_{CF} \quad \text{[Equation 18]}$$

In equation 18, $c_{init}$ is the initial value of the gold sequence c(n). $n_s$ means a slot number in a frame, and l indicates an OFDM symbol number in the slot. $N_{ID}^{cell}$ is an identifier of a cell where the transmitter belongs, and $N_{CP}$ is a parameter determined according to following equation 19, depending on a cyclic prefix CP of an LTE system.

$$N_{CP} = \begin{cases} 1 & \text{for Normal } CP \\ 0 & \text{for Extended } CP \end{cases} \quad \text{[Equation 19]}$$

m in equations 17 and 19 is determined according to following equation 20.

$$m = 0, 1, \ldots 2N_{RB}^{max,DL}-1 \quad \text{[Equation 20]}$$

Referring to equation 17 to equation 20, the common reference signal CRS is uniquely determined according to the slot number in the frame, the OFDM symbol number in the slot, the identifier of the cell in which the transmitter is included and a kind of the CP. Accordingly, the common reference signal may be used for cell selection of the receiver.

In one embodiment, the transmission unit 210 may modulate the phase of the common reference signal depending on the identifier of the transmission training beam according to following equation 21.

$$r^b(m) = r(m)\phi^b(m) \quad \text{[Equation 21]}$$

In equation 21, $r^b(m)$ means a common reference signal of which a phase is modulated according to the identifier of the transmission training beam, and r(m) indicates a common reference signal generated according to equation 17. $\phi^b(m)$ is a phase varying value determined according to the identifier of the transmission training beam, and is determined according to following equation 22.

$$\phi^b(k) = e^{j\frac{2\pi k b \alpha}{N}} \quad \text{[Equation 22]}$$

In equation 22, k means an index of a subcarrier in which the common reference signal is carried, and k=0, 1, . . . , N−1. b indicates an identifier of the transmission training beam, and b=0, 1, . . . N−1. α means a phase varying factor as predetermined constant. N indicates a number of a subcarrier of the common reference signal included in a band capable of compensating a channel by using a primary synchronization signal PSS.

In one embodiment, the transmission unit 210 may transmit the frame shown in (c) in FIG. 3 including the common reference signal of which the phase is modulated according to equation 21. Unlike (b) in FIG. 3, in the event that the common reference signal includes the identifier of the transmission training beam, the transmission unit 210 may transmit sequentially the secondary synchronization signal SSS, the primary synchronization signal PSS and the common reference signal CRS. In this case, if the secondary synchronization signal and the common reference signal are detected after initial synchronization is achieved by the primary synchronization signal, the channel may be more easily compensated.

In one embodiment, the transmission unit 210 may select one of the transmission beams 131, 132, 133 and 134 as the transmission training beam as shown in FIG. 1 and then perform the beam training using the selected transmission beam. The receiver 140 may select one of the receiving beams as the receiving training beam and perform the beam training using the selected receiving beam. If N transmission beams and M receiving beams exist, beam matching may be performed about (M×N) numbers of beam combination for the purpose of performing the beam training. In this case, the transmission unit 210 may transmit the identifier of the transmission training beam using the frame shown in FIG. 3.

Figure 6:
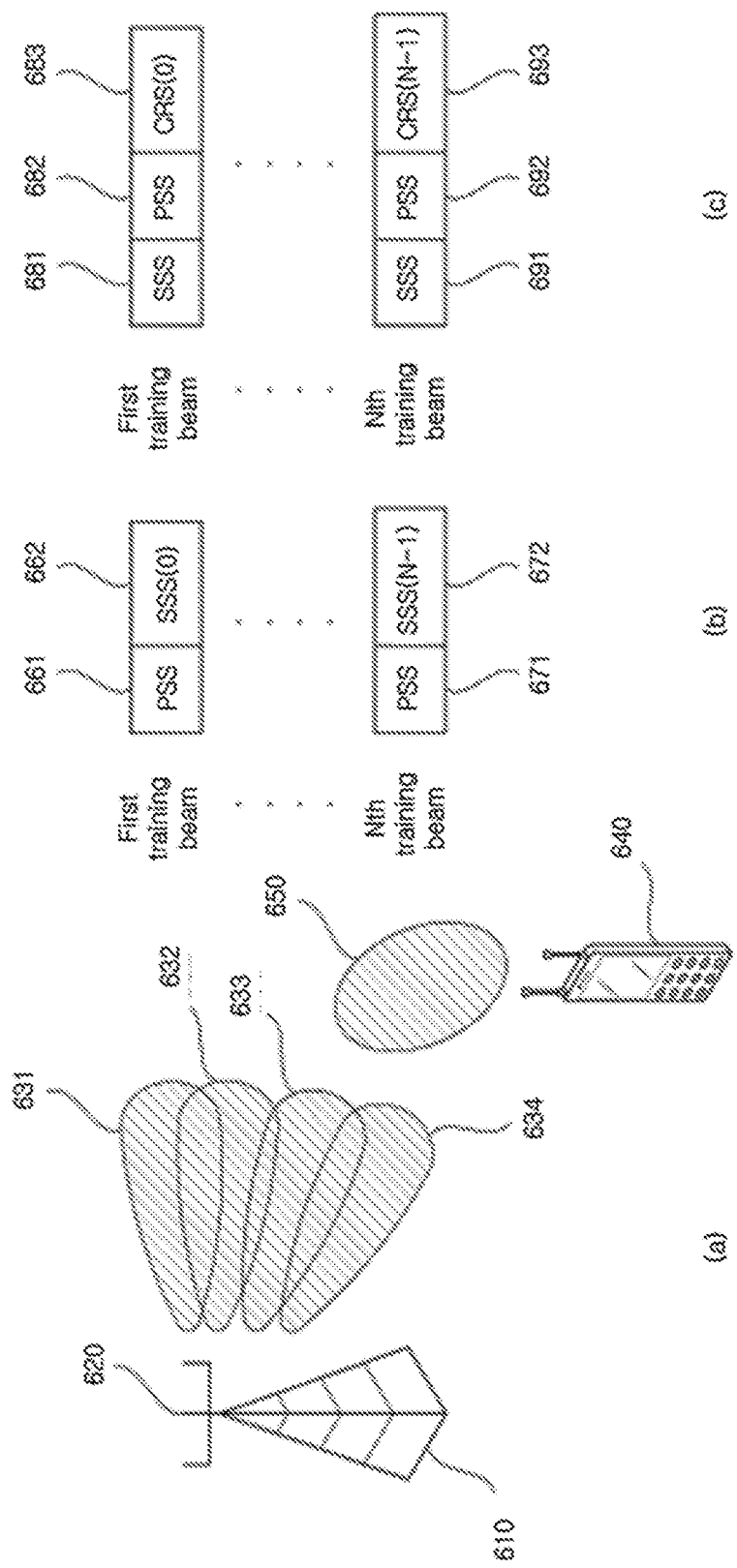
FIG. 6 is a view illustrating a process of transmitting simultaneously identifiers of transmission training beams using the transmission training beams.

(a) in FIG. 6 is a view illustrating a process of transmitting simultaneously identifiers of transmission training beams using the transmission training beams.

A transmitter 610 may form transmission beams 631, 632, 633 and 634 using a transmission array 620. A receiver 640 may form a receiving beam 650 using a receiving array 650.

In one embodiment, a transmission unit 210 of the transmitter 610 may select every beam as transmission training beams as shown in FIG. 6, and transmit identifiers of the transmission training beams using the selected transmission training beams. For example, an identifier of a first transmission training beam 631 is transmitted by using the first transmission training beam 631, and an identifier of a second transmission training beam 632 is transmitted by using the second transmission training beam 632. An identifier of a third transmission training beam 633 and an identifier of a fourth transmission training beam 634 are also transmitted in a similar method.

In one embodiment, the transmission unit 210 may transmit the identifier of the transmission training beam by using a secondary synchronization signal in a frame shown in (b) in FIG. 6. A first frame transmitted by using a first transmission training beam may include a first slot 661 having a primary synchronization signal PSS and a second slot 662 having a secondary synchronization signal SSS. In a similar method, an Nth frame transmitted by using an Nth transmission training beam may include a first slot 671 having a primary synchronization signal PSS and a second slot 672 having a secondary synchronization signal SSS. Here, numeral in a parenthesis following the second synchronization signal indicates the identifier of the transmission training beam transmitted by using corresponding secondary synchronization signal. The transmission unit 210 may transmit simultaneously the frames shown in (b) in FIG. 6, and the receiver 640 may receive simultaneously the frames. If the phase of the secondary synchronization signal is modulated according to the embodiment in FIG. 4, FIG. 5 or equation 1 to equation 16, every secondary synchronization signal, of which the phase is modulated, in the frames becomes orthogonal. Accordingly, the receiver 640 may receive separately the secondary synchronization signals transmitted by using different transmission training beams, and detect separately the identifiers of the transmission training beams.

In one embodiment, the transmission unit 210 may transmit the identifier of the transmission training beam by using a common reference signal included in a frame shown in (c)

in FIG. 6. A first frame transmitted by using a first transmission training beam may include a first slot 681 having a secondary synchronization signal SSS, a second slot 682 having a primary synchronization signal PSS and a third slot 683 having a common reference signal CRS. In a similar method, an Nth frame transmitted by using an Nth transmission training beam may include a first slot 691 having a secondary synchronization signal SSS, a second slot 692 having a primary synchronization signal PSS and a third slot 693 having a common reference signal CRS. Here, numeral in parenthesis following the common reference signal indicates an identifier of a transmission training beam transmitted by using respective common reference signals. If a phase of the common reference signal is modulated according to the embodiment in equation 17 to equation 22, every common reference signal, of which the phase is modulated, becomes orthogonal. Accordingly, the receiver 640 may receive separately the common reference signals transmitted by using different transmission training beams and detect separately the identifiers of respective transmission training beams.

In the embodiment in FIG. 6, the transmitter may transmit simultaneously the identifiers of the transmission training beams by using the transmission training beams. Accordingly, although the transmitter forms N transmission beams and the receiver forms M receiving beams, the beam training may be completed if the receiver performs the beam matching about only M beam combination.

In FIG. 6, only one symbol is included in the slots 662, 672, 683 and 693 for transmitting the identifier of the transmission training beam. However, respective slots 662, 672, 683 and 693 may include symbols for transmitting the identifier of the transmission training beam. Each of the symbols may be a part of the secondary synchronization signal or the common reference signal. In the event that the symbols including the identifier of the transmission training beam is transmitted, the receiver may detect more correctly the identifier of the transmission training beam by averaging the symbols.

Figure 7:
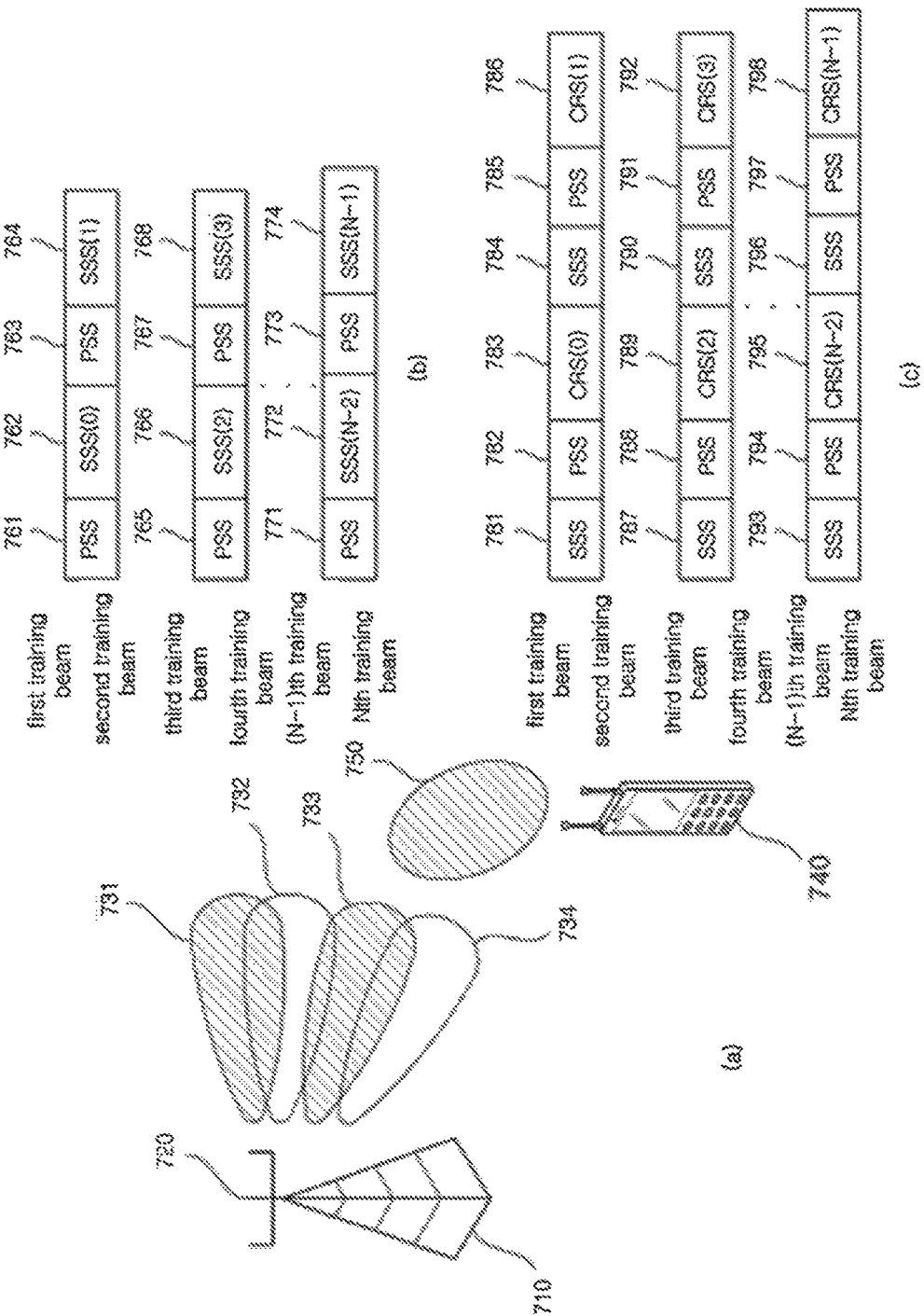
FIG. 7 is a view illustrating a process of transmitting an identifier of a transmission training beam using transmission training beams not adjacent each other.

(a) in FIG. 7 is a view illustrating a process of transmitting an identifier of a transmission training beam using transmission training beams not adjacent each other.

A transmitter 710 may form transmission beams 731, 732, 733 and 734 using a transmission array 720. A receiver 740 may form a receiving beam 750 using a receiving array.

In one embodiment, a transmission unit 210 of the transmitter 710 may select N/2 beams of N beams 731, 732, 733 and 734 formed by using the transmission array 720 shown in FIG. 7, as a transmission training beam. For example, the transmission unit 210 may array the beams 731, 732, 733 and 734 in a direction where gain is maximized. In one aspect, the transmission unit 210 may select beams 731 and 733 or 732 and 734, which are not adjacent, of the beams 731, 732, 733 and 734 as the transmission training beam. For instance, the transmission unit 210 may select odd number beams of the arrayed beams as the transmission training beam or select even number beams of the arrayed beams as the transmission training beam.

(b) in FIG. 7 is a view illustrating a frame used for transmitting an identifier of a transmission training beam using a secondary synchronization signal.

In a first time interval, the transmission unit 210 transmits the frame using a first transmission training beam, a third transmission training beam and a (N−1)th transmission training beam. A first frame transmitted by using the first transmission training beam may include a first slot 761 having a primary synchronization signal PSS and a second slot 762 having a secondary synchronization signal SSS. In a similar method, a third frame transmitted by using a third transmission training beam may include a first slot 765 having a primary synchronization signal PSS and a second slot 766 having a secondary synchronization signal SSS, and a (N−1)th frame transmitted by using the (N−1)th transmission training beam may include a first slot 771 having a primary synchronization signal PSS and a second slot 772 having a secondary synchronization signal SSS. Here, numeral in parenthesis following the secondary synchronization signal indicates an identifier of the transmission training beam transmitted by using respective secondary synchronization signals.

In a second time interval, the transmission unit 210 transmits a frame using a second transmission training beam, a fourth transmission training beam and an Nth transmission training beam. A second frame transmitted by using the second transmission training beam may include a first slot 763 having a primary synchronization signal PSS and a second slot 764 having a secondary synchronization signal SSS. In a similar way, a fourth frame transmitted by using the fourth transmission training beam may include a first slot 767 having a primary synchronization signal PSS and a second slot 768 having a secondary synchronization signal SSS, and an Nth frame transmitted by using the Nth transmission training beam may include a first slot 773 having a primary synchronization signal PSS and a second slot 773 having a secondary synchronization signal SSS.

(c) in FIG. 7 is a view illustrating a frame used for transmitting an identifier of a transmission training beam using a common reference signal.

In a first time interval, the transmission unit 210 transmits a frame using a first transmission training beam, a third transmission training beam and a (N−1)th transmission training beam. A first frame transmitted by using the first transmission training beam may include a first slot 781 having a secondary synchronization signal SSS, a second slot 782 having a primary synchronization signal PSS and a third slot 783 having a common reference signal CRS. In a similar method, a third frame transmitted by using the third transmission training beam may include a first slot 787 having a secondary synchronization signal SSS, a second slot 788 having a primary synchronization signal PSS and a third slot 789 having a common reference signal CRS, and a (N−1) frame transmitted by using the (N−1)th transmission training beam may include a first slot 793 having a secondary synchronization signal SSS, a second slot 794 having a primary synchronization signal PSS and a third slot 795 having a common reference signal CRS. Here, numeral in parenthesis following the secondary synchronization signal indicates the identifier of the transmission training beam transmitted by using respective secondary synchronization signals.

In a second time interval, the transmission unit 210 transmits a frame using a second transmission training beam, a fourth transmission training beam and an Nth transmission training beam. A second frame transmitted by using the second transmission training beam may include a first slot 784 having a secondary synchronization signal SSS, a second slot 785 having a primary synchronization signal PSS and a third slot 786 having a common reference signal CRS. In a similar way, a fourth frame transmitted by using the fourth transmission training beam may include a first slot 790 having a secondary synchronization signal SSS, a second slot 791 having a primary synchronization signal PSS and a third slot 792 having a common reference signal CRS, and an N frame transmitted by using the Nth transmission training beam may include a first slot 796 having a secondary synchronization signal SSS, a second slot 797 having a primary synchronization signal PSS and a third slot 798 having a common reference signal CRS.

Referring to the embodiment in FIG. 7, the transmitter may prevent performance deterioration due to adjacent beams and transmit simultaneously the identifiers of the transmission training beams by using the transmission training beams. Accordingly, a time taken for performing the beam training may be considerably reduced.

In FIG. 7, only one symbol is included in respective slots 762, 764, 766, 768, 772, 774, 783, 786, 789, 792, 795 and 798 for transmitting the identifiers of the transmission training beams. However, each of the symbols 762, 764, 766, 768, 772, 774, 783, 786, 789, 792, 795 and 798 may include plural symbols for transmitting the identifier of the transmission training beam. Respective symbols may be a part of the secondary synchronization signal or the common reference signal. In the event that the symbols including the identifier of the transmission training beam are transmitted, the receiver may detect more accurately the identifier of the transmission training beam by averaging the symbols.

The receiver receives a transmission signal transmitted from the transmitter by using the transmission training beam. Here, the transmission signal may be a secondary synchronization signal or a common reference signal of an LTE system.

The receiver generates channel state information about wireless channel between the transmitter and the receiver by using the transmission signal transmitted from the transmitter. In one embodiment, the channel state information may be SNR or SINR.

In the event that plural transmission signals are transmitted by using the transmission training beams as shown in FIG. 6 and FIG. 7, it is necessary to estimate the wireless channel corresponding to respective transmission training beams. In the event that the secondary synchronization signal of which the phase is modulated according to the embodiment in FIG. 4, FIG. 5 or equation 1 to equation 16 is used as the transmission signal, or the common reference signal of which the phase is modulated according to the embodiment in equation 17 to equation 22 is used as the transmission signal, the transmission signals become orthogonal. Accordingly, the receiver may receive separately the transmission signals and estimate easily the wireless channel corresponding to respective transmission training beams.

The receiver 240 transmits the generated channel state information to the transmitter. The receiving unit 220 of the transmitter receives the channel state information from the receiver 240. The receiving unit 220 may estimate data transmission performance of a pair of the beams including the transmission training beam and the receiving training beam, based on the received channel state information. In one embodiment, the transmitter may estimate the data transmission performance about every pair of the beams, select a transmission beam included in a pair of the beams having most excellent data transmission performance as the data transmission beam, and select a receiving beam included in a pair of the beams having most excellent data transmission performance as the data receiving beam. The transmission unit 210 may transmit data to the receiver 240 using the data transmission beam.

The receiver 240 may detect the identifier of the beam using the primary synchronization signal PSS, the secondary synchronization signal SSS and the common reference signal.

In one embodiment, the transmitter 210 may transmit the identifier of the transmission training beam using the interleaved secondary synchronization signal shown in FIG. 4. In this case, the receiver 240 may detect the identifier of the transmission training beam using a maximum likelihood ML technique according to following equation 23.

[Equation 23]

$$s_b(i) = \left| \sum_{k=0}^{61} y(k)(SSS_i^b(k))^* \right|^2$$

$$[N\hat{I}D1, B\hat{I}D] = \underset{b \in \{0,1,\ldots N-1\}}{\operatorname{argmax}} \left\{ \underset{i \in \{0,1,\ldots,167\}}{\operatorname{argmax}} \{s_b(i)\} \right\}$$

In equation 23, y(k) means the interleaved secondary synchronization signal received by the receiver 240, and $s_b(i)$ indicates an identifier of the transmission training beam when a bth transmission beam of ith cell is used as the transmission training beam. The receiver may detect the identifier of the transmission training beam by using correlation value of the received transmission signal and a reference signal $SSS_1^b(k)$. Here, $SSS_i^b(k)$ is a reference signal when the interleaved secondary synchronization signal is transmitted from the ith cell using the bth transmission beam.

In another embodiment, the transmitter 210 may include the identifier of the transmission training beam in the secondary synchronization signal as shown in FIG. 5, and then perform the interleaving. In this case, the transmitter 240 may detect the transmission training beam using the ML technique according to following equation 24.

[Equation 24]

$$[\hat{m}_0, \hat{a}_0] = \underset{j}{\operatorname{argmax}} \left\{ \underset{i}{\operatorname{argmax}} \left\{ \left| \sum_{k=0}^{30} \beta^{m_0,a_0}(k)(s_0^{i,j}(k))^* \right|^2 \right\} \right\}$$

$$[\hat{m}_1, \hat{a}_1] = \underset{j}{\operatorname{argmax}} \left\{ \underset{i}{\operatorname{argmax}} \left\{ \left| \sum_{k=0}^{30} \beta^{m_1,a_1}(k)(s_1^{i,j}(k))^* \right|^2 \right\} \right\}$$

In equation 24, $\beta^{m_0,a_0}(k)$ and $\beta^{m_1,a_1}(k)$ are interleaved secondary synchronization signals and are determined according to following equation 25. $s_0^{i,j}(k)$ and $s_1^{i,j}(k)$ are reference signals for detecting the identifier of the cell and the identifier of the transmission training beam and are determined according to following equation 26.

$$\beta^{m_0 a_0}(k) = y(2k)c_0(k)$$

$$\beta^{m_1 a_1}(k) = y(2k-1)c_1(k)z_1^{(m_0)}$$ [Equation 25]

$$s_0^{i,j}(k) = s_0^{(m_0)}(k)\phi^{(a_0)}(k)$$

$$s_1^{i,j}(k) = s_0^{(m_1)}(k)\phi^{(a_1)}(k)$$ [Equation 26]

In another embodiment, the transmission unit 210 may include the identifier of the transmission training beam in the common reference signal according to the embodiment in equation 17 to equation 22 and transmit the common reference signal. The receiver 240 may detect the identifier of the transmission training beam using the ML technique.

[Equation 27]

$$[B\hat{I}D] = \underset{i}{\operatorname{argmax}} \left\{ \sum_{k=0}^{9} |Y(k)r^i(k)|^2 \right\}$$

In equation 27, BÎD is an estimation value of the identifier of the transmission training beam, Y(k) is a receiving signal corresponding to the common reference signal, and r'(k) is a reference signal of the transmitted common reference signal including the transmission training beam. k is an index of a subcarrier in which the common reference signal is carried. In the LTE system, a number of the subcarriers in which the common reference signal is carried is 10, and thus values corresponding to k in the range of 0 to 9 are summed up in the equation 27.

In one embodiment, the transmission unit 210 may transmit the identifier of the transmission training beam using the frame in (c) in FIG. 3, (c) in FIG. 6 or (c) in FIG. 7. The receiver may compensate correctly a channel of the common reference signal CRS using adjacent primary synchronization signal PSS and common reference signal CRS.

The receiver 240 may receive the transmission signals including the identifier of the transmission reference beams. In one aspect, the receiver 240 may detect the identifier of the transmission reference beam from every received transmission signal. In another aspect, the receiver 240 may measure a receiving power of respective receiving signals and detect the identifier of the transmission reference beam corresponding to a receiving signal from the receiving signal of which the receiving power is more than critical value.

Figure 8:
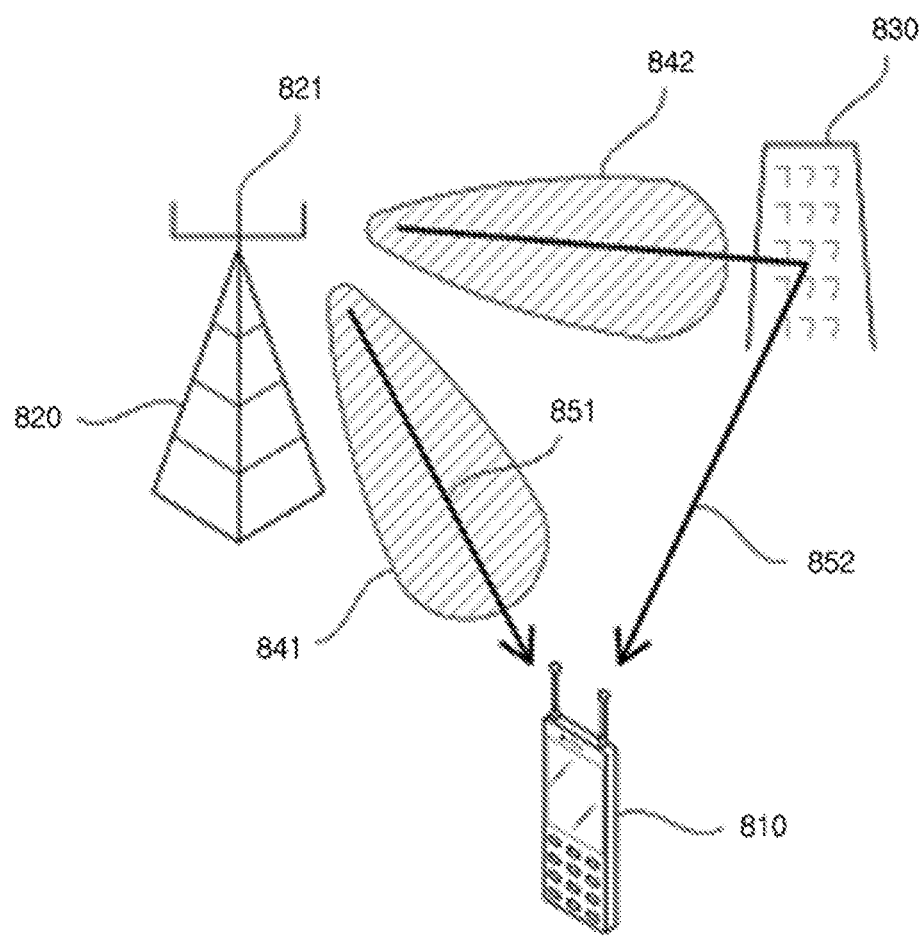
FIG. 8 is a view illustrating an operation when a receiver 810 receives identifiers of transmission training beams from one transmitter using multi path.

FIG. 8 is a view illustrating an operation when a receiver 810 receives identifiers of transmission training beams from one transmitter using multi path.

A transmitter 820 may form transmission beam 841 and 842 using a transmission array 821. The transmitter 820 may select each of the transmission beams 841 and 842 as a transmission training beam and transmit identifiers of the transmission training beams 841 and 842 using the selected transmission training beams 841 and 842. Here, the identifier of the transmission training beam 841 is transmitted from the transmitter 820 to the receiver 810 through a first path 851, and the identifier of the transmission training beam 842 is transmitted from the transmitter 820 to the receiver 810 through a second path 852 where the transmission training beam 842 is reflected by a building.

The receiver 810 receives a receiving signal including a first signal transmitted through the first path 851 and a second signal transmitted through the second path 852. The receiver 810 detects an identifier of a cell and the identifier of the transmission training beam, about the first signal and the second signal. In FIG. 8, the identifier of the cell of the first signal is identical to that of the second signal, and the identifier of the transmission training beam of the first signal is different from that of the second signal. In this case, the receiver may determine that the first signal and the second signal are received through multi path after they are outputted from the same base station.

In one embodiment, the receiver 810 may receive data from the transmitter 820 by using a diversity technique or a spatial multiplexing technique.

In the event that the receiver 810 uses the diversity technique, the transmitter 820 may select every of the first transmission training beam 841 and the second transmission training beam 842 as data transmission beams. The transmitter 820 may transmit transmission signals including the same data through the first data transmission beam 841 and the second data transmission beam 842. The receiver 810 may combine the transmission signals transmitted by using the first data transmission beam 841 and the second data transmission beam 842. The receiver 810 may detect the data from the combined signal.

In the event that the receiver 810 uses the spatial multiplexing technique, the transmitter 820 may select every of the first transmission training beam 841 and the second transmission training beam 842 as data transmission beams. The transmitter 820 may transmit a first transmission signal including first data using the first data transmission beam 841 and transmit a second transmission signal including second data using the second data transmission beam 842. The receiver 810 may detect the first data from the first transmission signal and detect the second data from the second transmission signal.

Figure 9:
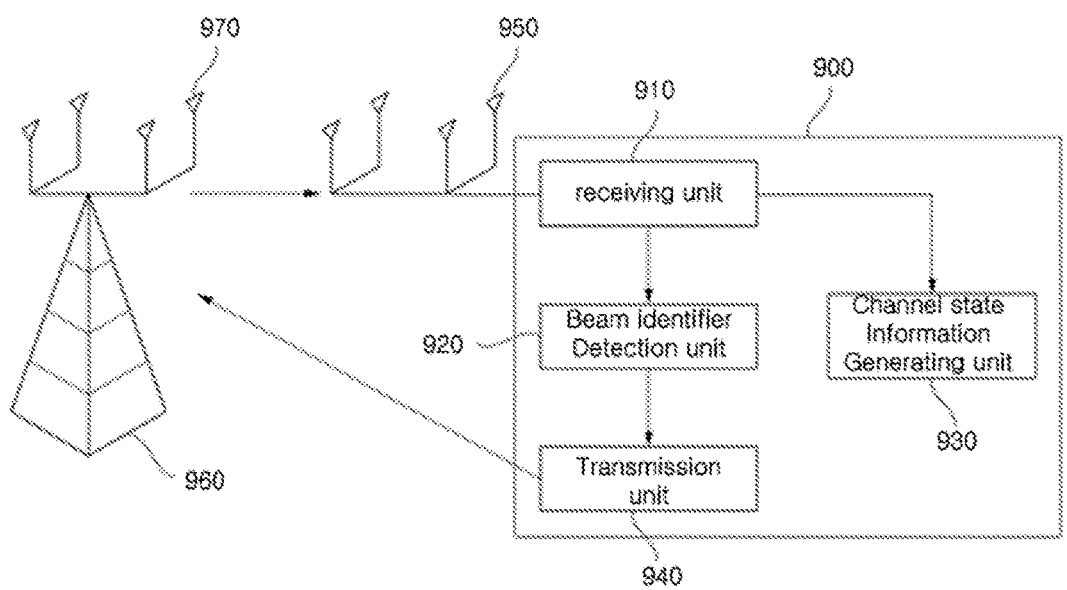
FIG. 9 is a block diagram illustrating a receiver according to one embodiment of the invention.

FIG. 9 is a block diagram illustrating a receiver according to one embodiment of the invention. A receiver 900 of the embodiment includes a receiving unit 910, a beam identifier detection unit 920, a channel state information generating unit 930 and a transmission unit 940.

The transmitter 960 includes a transmission array 970. The transmitter 960 may form plural transmission beams using the transmission array 960. The transmitter 960 may transmit data using a data transmission beam selected from the transmission beams.

The receiving unit 910 includes a receiving array 950. The receiving unit 910 may receive the data from the transmitter 960 using a data receiving beam selected from receiving beams formed by using the receiving array 950.

The receiver 900 may perform the beam training to select a pair of a data transmission beam and a data receiving beam for transmitting data from the transmission beams and the receiving beams.

The receiving unit 910 may receive the identifier of at least one transmission training beam selected from the transmission beams from the transmitter 960. In one embodiment, the receiving unit 910 may receive the identifier of the transmission training beam using the selected transmission training beam. In one aspect, the receiving unit 910 may receive the identifier of the transmission training beam using the receiving training beam selected from the receiving beams.

The transmitter 960 may generate N transmission beams, and the receiver 900 may generate M receiving beams. In one embodiment, in the event that the transmitter 960 transmits the identifier of the transmission training beam using selected one transmission training beam, the transmitter 960 and the receiver 900 may perform the beam matching about (M×N) combination and generate the channel state information according to the beam matching.

In another embodiment, the transmitter 960 may select every N transmission beam as the transmission training beams and transmit simultaneously N identifiers of the transmission training beams. The transmitter 960 and the receiver 900 may perform the beam matching about N combination and generate the channel state information according to the beam matching.

In still another embodiment, the transmitter 960 may select N/2 transmission beams as the transmission training beam and transmit simultaneously N/2 identifiers of the transmission training beams. The transmitter 960 and the receiver 900 may perform twice beam matching about N/2 combination and generate the channel state information according to the beam matching.

In one embodiment, the transmitter 960 may transmit the receiving signal of which phase includes the identifier of the transmission training beam to the receiver 910. The receiver 910 may receive the receiving signal from the transmitter 960, and the beam identifier detection unit 920 may detect the identifier of the transmission training beam from the phase of the receiving signal.

In one aspect, the receiving signal may be the secondary synchronization signal of the LTE system. In the event that the receiving unit 910 receives the receiving signal generated by modulating the phase of the interleaved secondary synchronization signal according to the identifier of the transmission training beam, the beam identifier detection unit 920 may detect the identifier of the transmission training beam according to equation 23. Additionally, in the event that the receiving unit 910 receives the receiving signal generated by interleaving the secondary synchronization signal of which the phase is modulated according to the transmission training beam, the beam identifier detection unit 920 may detect the identifier of the transmission training beam according to equation 24.

In one aspect, the receiving signal received by the receiving unit 910 may be the common reference signal of the LTE system. In the event that the receiving unit 910 receives the receiving signal generated by modulating a phase of the common reference signal according to the identifier of the transmission training beam, the beam identifier detection unit 920 may detect the identifier of the transmission training beam according to equation 27.

In one embodiment, the receiving unit 910 may detect the identifier of the transmission training beam using a coherent receiving method or a non coherent receiving way. In the event that the receiving unit 910 uses the coherent receiving method, the receiving unit 910 receives the primary synchronization signal using the transmission training beam. The receiving unit 910 sets time synchronization with the transmitter 960 using the primary synchronization signal. Moreover, the receiving unit 910 estimates wireless channel between the transmitter 960 and the receiver 900. The receiving unit 910 compensates the phase of the receiving signal (secondary synchronization signal or common reference signal) including the identifier of the transmission training beam by using the estimated channel. The beam identifier detection unit 920 may detect the identifier of the transmission training beam from the receiving signal of which the phase is compensated. In one aspect, the beam identifier detection unit 920 may calculate a value corresponding to the modulated phase of the secondary synchronization signal or the common reference signal, and detect the identifier of the transmission training beam from the calculated value.

In the event that the receiving unit 920 uses the non coherent receiving way, the receiving unit 910 sets the time synchronization with the transmitter 960 using the primary synchronization signal. The beam identifier detection unit 920 may detect the identifier of the transmission training beam from the receiving signal of which channel distortion is not compensated.

The channel state information generating unit 930 generates the channel state information of the wireless channel between the transmitter 960 and the receiver 900 using the receiving signal received by the receiving unit 910. Here, the channel state information may be SNR or SINR.

The transmission unit 940 may transmit the generated channel state information to the transmitter 960. The transmitter 960 may estimate data transmission performance of a pair of the transmission training beam and the receiving training beam, based on the generated channel state information. The transmitter 960 may select the transmission training beam, included in a pair of the transmission training beam and the receiving training beam having most excellent data transmission performance, as the data transmission beam, and select the receiving training beam, included in a pair of the transmission training beam and the receiving training beam having most excellent data transmission performance, as the data receiving beam. That is, the channel state information may be used for determining whether or not the data is transmitted from the transmitter 960 to the receiver 900 using corresponding transmission training beam and receiving training beam.

In one embodiment, the receiving unit 910 may receive transmission signals including an identifier of a transmission reference beam from the transmitter 960. For example, the beam identifier detection unit 920 may detect the identifiers of the transmission reference beams from every received transmission signals. For another example, the receiving unit 910 may measure a receiving power of respective receiving signals, and the beam identifier detection unit 920 may detect the identifier of corresponding transmission reference beam from a receiving signal of which receiving power is more than critical value.

In one embodiment, the receiving unit 910 may receive the identifier of respective transmission training beams using the transmission training beams. That is, the receiver 910 may receive a first signal transmitted through a first path by using a first transmission training beam and receive a second signal transmitted through a second path by using a second transmission training beam.

Here, the beam identifier detection unit 920 may detect the identifier of the transmission training beam from a receiving signal including the first signal and the second signal.

In the event that identifiers of two or more different transmission training beams are detected from the receiving signal, the receiving unit 910 may perform data transmission using every transmission training beam corresponding to each of the identifiers.

In one embodiment, in the event that the receiving unit 910 uses a diversity technique, the transmitter 960 may select every of a first training beam and a second training beam as a data transmission beam. The transmitter 960 may transmit transmission signals including the same data by using a first data transmission beam and a second data transmission beam. The receiving unit 910 may combine transmission signals transmitted by using the first data transmission beam and the second data transmission beam. The receiving unit 910 may detect data from the combined signal.

In the event that the receiving unit uses a spatial multiplexing technique, the transmitter 960 may select every of the first training beam and the second training beam as the data transmission beam. The transmitter 960 may transmit a first transmission signal including a first data using the first data transmission beam and transmit a second transmission signal including a second data using the second data transmission beam. The receiving unit 910 may detect the first data from the first transmission signal and detect the second data from the second transmission signal.

Figure 10:
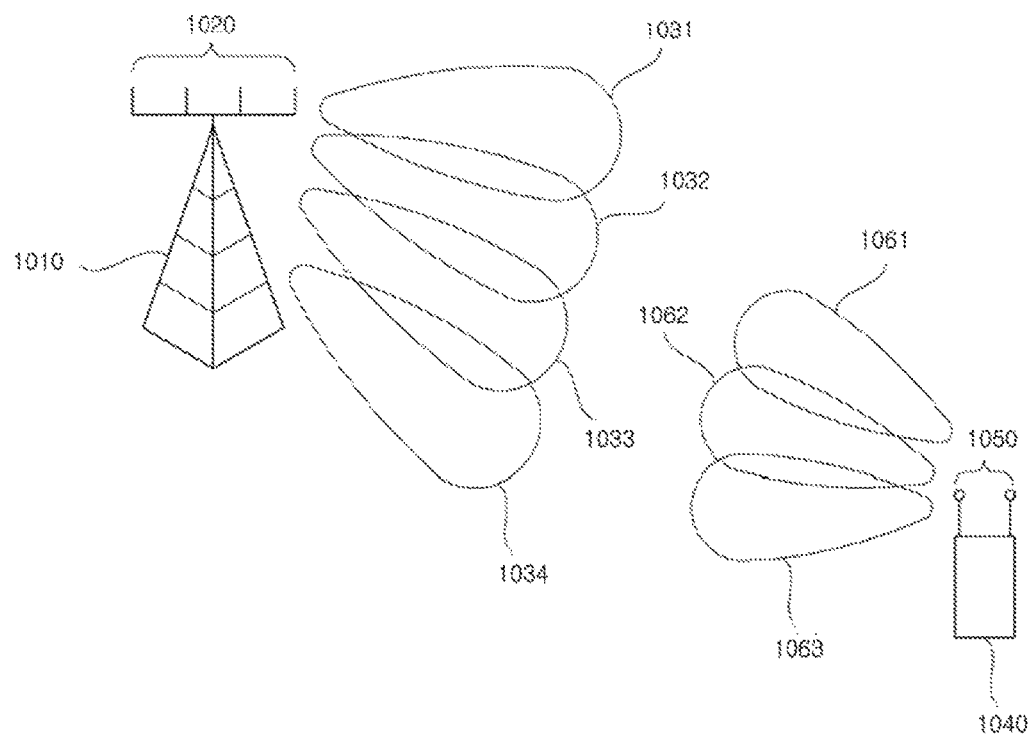
FIG. 10 is a view illustrating beam training for searching a pair of optimal beams between a transmitter using a transmission array and a receiver using a receiving array.

FIG. 10 is a view illustrating beam training for searching a pair of optimal beams between a transmitter using a transmission array and a receiver using a receiving array.

The transmitter 1010 includes a transmission array 1020. In one embodiment, a base station, a relay, etc. in a mobile communication system may operate as the transmitter 1010 in FIG. 10. The transmission array 1020 is an array antenna including antenna elements, and transmits or receives data through combination of the antenna elements. In one aspect, in the transmission array 1020, the antenna elements may be arrayed with two dimensional shapes.

The transmitter 1010 may form transmission beams 1031, 1032, 1033 and 1034 using the transmission array 1020.

Here, the transmission beams 1031, 1032, 1033 and 1034 may be determined in advance. In one embodiment, the transmitter 1010 may select one or more of the transmission beams 1031, 1032, 1033 and 1034 capable of being formed by using the transmission array 1020 as a data transmission beam. The transmitter 1010 may transmit data to the receiver 1040 using the data transmission beam. As shown in FIG. 10, a technique for selecting the data transmission beam for transmitting the data from predetermined transmission beams 1031, 1032, 1033 and 1034 is called as a switched beamforming technique.

The receiver 1040 includes a receiving array 1050. In one embodiment, a terminal in the mobile communication system, etc. may operate as the receiver 1040 in FIG. 10. The receiving array 1050 is an array antenna including antenna elements, and transmits or receives data through combination of the antenna elements. In one aspect, in the receiving array 1050, the antenna elements may be arrayed with two dimensional shapes.

The receiver 1040 may form receiving beams 1061, 1062 and 1063 using the receiving array 1050. Here, the receiving beams 1061, 1062 and 1063 may be predetermined. In one embodiment, one or more of the receiving beams 1061, 1062 and 1063 may be selected as a data receiving beam. The receiver 1040 may receive data from the transmitter 1010 using the data receiving beam.

Referring to the embodiment in FIG. 10, the data transmission beam and the data receiving beam may be combined with 12 cases (four data transmission beams X three data receiving beams) for the purpose of transmitting or receiving the data. In one embodiment, the transmitter 1010 and the receiver 1040 may search in sequence the 12 cases and determine the data transmission beam and the data receiving beam through the searching.

For example, the transmitter 1010 may select one of the transmission beams 1031, 1032, 1033 and 1034 as a transmission training beam, e.g. 1032 and transmit a transmission signal to the receiver 1040 using the selected transmission training beam 1032. The receiver 1040 may select one of the receiving beams 1061, 1062 and 1063 as a receiving training beam, e.g. 1061, receive the transmission signal using the selected receiving training beam 1061, generate SNR or SINR of the received transmission signal and feedback the generated SNR or SINR to the transmitter 1010. The transmitter 1010 may evaluate data transmission performance of a pair of beams including the transmission training beam 1032 and the receiving training beam 1061 based on the SNR or SINR, etc. received from the receiver 1040. In one embodiment, the transmitter 1010 may evaluate data transmission performance of every pair of beams, select a transmission beam included in a pair of the beams having most excellent data transmission performance as a data transmission beam through the evaluation, and select a receiving beam included in the pair of beams having most excellent data transmission performance as a data receiving beam through evaluation.

The transmitter 1010 and the receiver 1040 should search a data transmission beam and a data receiving beam capable of realizing optimal performance in the event that the receiver 1040 transmits or receives first data, or in the event that the receiver 1040 moves. However, much time is taken for searching the data transmission beam and the data receiving beam, i.e. performing the beam training process.

For example, the transmitter 1010 may transmit a synchronization signal for synchronizing with the receiver 1040, and then perform the beam training. In this case, the receiver 1040 performs the beam training after it synchronizes with the transmitter 1010, and thus much time is taken until the beam training is completed.

Figure 11:
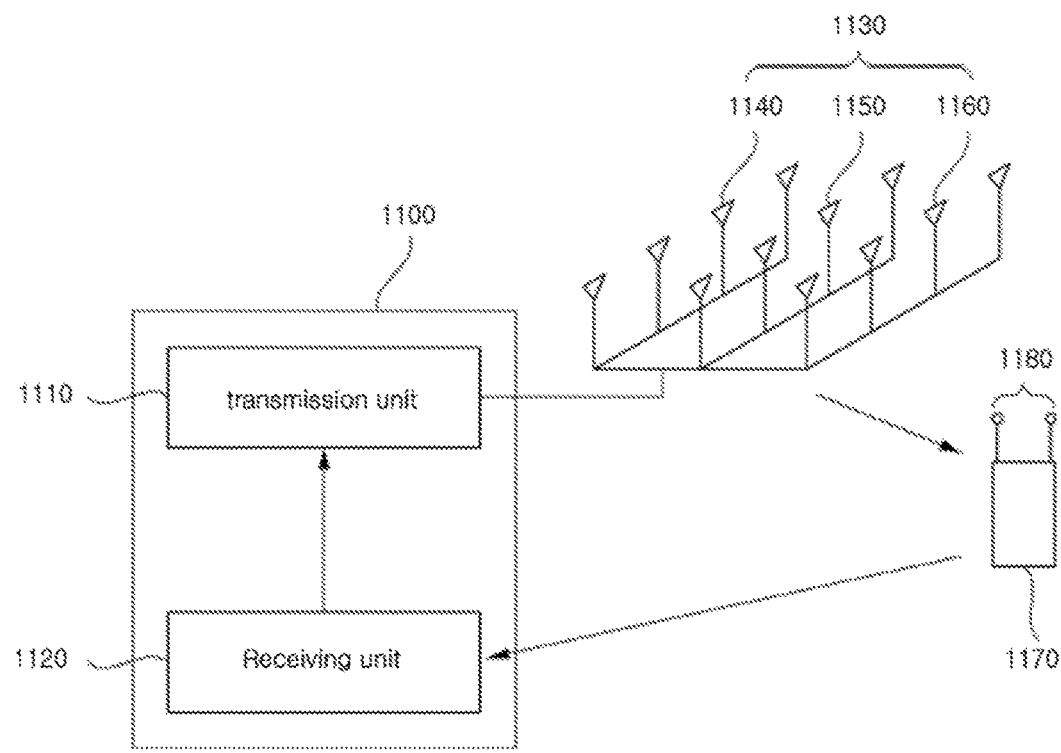
FIG. 11 is a block diagram illustrating a transmitter according to one embodiment of the invention.

FIG. 11 is a block diagram illustrating a transmitter according to one embodiment of the invention.

The transmitter 1100 of the embodiment includes a transmission unit 1110 and a receiving unit 1120.

The transmitter 1100 includes two dimensional transmission array 1130 and form a data transmission beam using the transmission array 1130. The transmitter 1100 transmits data to a receiver 1170 using the data transmission beam. The receiver 1170 includes receiving arrays 1180, and form a data receiving beam using the receiving arrays 1180. The receiver 1170 receives the data from the transmitter 1100 using the data receiving beam.

The transmission array 1130 of the transmitter 1100 may form a beam in various directions. Hereinafter, the beam generated by the transmission array 1130 is referred to as a transmission beam. Here, the data transmission beam may be selected from the transmission beams by using the beam training process. The receiving array 1180 of the receiver 1170 may form a beam in various directions. Hereinafter, the beam generated by the receiving array 1180 is referred to as a receiving beam. Here, the data receiving beam may be selected from the receiving beams by using the beam training process.

In one embodiment, the transmission unit 1110 may select a training sub array from sub arrays 1140, 1150 and 1160 included in the transmission array 1130. The transmission unit 1110 may select the transmission training beam from transmission beams generated by the selected training sub array. The transmission unit 1110 may transmit an ID of the training sub array and an ID of the transmission training beam to the receiver 1170 using the transmission training beam.

The transmitter 1100 may receive the ID of the training sub array and the ID of the transmission training beam transmitted by using the transmission training beam. The receiver 1100 recognizes the ID of the training sub array and the ID of the transmission training beam, and so the beam training process may be rapidly performed.

In one embodiment, the transmission unit 1110 may transmit the ID of the transmission training beam and the ID of the training sub array to a physical layer. This means that the receiver 1170 decodes the ID of the transmission training beam and the ID of the training sub array through its physical layer not an upper layer.

In one embodiment, the transmission unit 1110 may transmit a symbol including information concerning the ID of the transmission training beam and information concerning the ID of the training sub array to the receiver 1170. In this case, the receiver 1170 may detect the symbol through the physical layer and decode the ID of the transmission training beam and the ID of the training sub array on the physical layer.

The embodiment in FIG. 10 may be applicable to an uplink as well as a downlink in the mobile communication system. In the downlink, a beam training process may be performed after synchronization using a prior synchronization signal SS and ID searching of a cell are completed. A symbol used for transmitting the ID of the transmission training beam and the ID of the training sub array in the downlink may be referred to as a beam ID preamble BIDP. The receiver 1040 may employ a switched beamforming technique or a digital beamforming technique.

In the uplink, a beam training process may be performed after uplink synchronization using an uplink preamble is completed. In one embodiment, the ID of the transmission training beam and the ID of the training sub array as well as a temporary station identifier TSTID may be simultaneously transmitted in a random access process. Here, a base station is organically connected to other base stations, and thus the ID of the transmission training beam and the ID of the training sub array transmitted from a terminal through the uplink are received to adjacent base stations, and a serving base station and optimal transmission training beam and training sub array may be determined by processing a received beam at a mobility management entity MME. The terminal uses the switched beamforming technique because it is easy to realize hardware such as an ADC, etc. therein, and it is proper to use a digital type adaptive beamforming technique in the base station because limitation of hardware is low. However, the base station may use the switched beamforming technique.

Hereinafter, FIG. 10 to FIG. 18 show embodiments applying the invention to a downlink of a mobile communication system, and FIG. 19 to FIG. 22 illustrate embodiments applying the invention to an uplink of the mobile communication system.

In the event that the invention is applied to the downlink as shown in FIG. 10 to FIG. 18, the base station 1010 in the mobile communication system may operate as a transmitter, and the terminal 1040 in the mobile communication system may operate as a receiver.

The transmission unit 1110 may transmit the ID of the transmission training beam and the ID of the training sub array to the receiver 1170 by using various techniques.

1) Embodiment 1 of Transmitting the ID Using a Gold Sequence

In one embodiment, the transmission unit 1110 may generate the gold sequence based on the ID of the transmission training beam and the ID of the training sub array according to following equation 28, and transmit the generated gold sequence to the receiver 1170.

$$B_n^g(k) = x_1(k+n)_{mod\ N} + x_2(k+n+s)_{mod\ N} \quad \text{[Equation 28]}$$

Here, $B_n^g(k)$ indicates the generated gold sequence. k means an index of a subcarrier in which the gold sequence is modulated, and k=0, 1, . . . , N−1. n=0, 1, . . . , $N_{ID}$−1. N indicates a length of the gold sequence. $x_1, x_2$ mean different m sequences having a length of N. N is a parameter for separating IDs of cells by cyclic-shifting a beam ID preamble in frequency domain. $N_{ID}$ is total number of the IDs of the cells. S is a parameter for determining the gold sequence, and s=$aA_{ST}$+b. a and b are parameters for separating the ID of the training sub array from the ID of the transmission training beam, a=0, 1, . . . , $A_{ST}$−1, and b=0, 1, . . . , $B_{ID}$−1. $B_{ID}$ means total number of transmission beams, and indicates total number of the training sub array.

2) Embodiment 2 of Transmitting the ID Using a Gold Sequence

In one embodiment, the transmission unit 1110 may generate the gold sequence based on the ID of the transmission training beam according to following equation 29, and map the generated gold sequence with certain interval in frequency domain according to the ID of the training sub array. The transmission unit 1110 may transmit the mapped gold sequence to the receiver 1170.

$$B_n^b(m) = x_1(m+m)_{mod\ N} + x_2(m+n+b)_{mod\ N} \quad \text{[Equation 29]}$$

Here, $B_n^b(m)$ is the generated gold sequence. $x_1, x_2$ are different m sequences having a length of N. m is a sequence index, and m=0, 1, . . . , $N_S$−1. n is a parameter for separating IDs of cells, and n=0, 1, . . . , $N_{ID}$−1. a and b are parameters for separating the ID of the training sub array from the ID of the transmission training beam, a=0, 1, . . . , $A_{ST}$−1, and b=0, 1, . . . , $B_{ID}$−1. Idx means an index of a subcarrier mapped in frequency domain, and Idx=$mA_{ST}$+a.

Referring to the embodiment 1 and the embodiment 2, more excellent feedback characteristic is achieved according as the length of the sequence increases in the event that the beam ID preamble is generated by using the gold sequence. Accordingly, if the ID of the transmission training beam and the ID of the training sub array are separated by using the gold sequence, many IDs of the transmission training beam and many IDs of the training sub array may be separated.

3) Embodiment 1 of Transmitting the ID Using a Chu Sequence

The transmission unit 1110 generates a Chu sequence based on the ID of the transmission training beam according to following equation 30 to equation 31. The transmission unit 1110 performs cyclic-shifting about the generated Chu sequence in frequency domain according to the ID of the training sub array, and transmits the shifted Chu sequence to the receiver.

$$B^b(k) = e^{j\frac{s\pi k(k+1)}{N_C}}, \quad gcd(b, N_C) = 1 \quad \text{[Equation 30]}$$

$$B_s^b(k) = B^b(k+s)_{mod\ N_C} \quad \text{[Equation 31]}$$

In equations 30 and 31, $B_s^b(k)$ means cyclic-shifted Chu sequence in frequency domain. k indicates an index of a subcarrier, and k=0, 1, . . . , $N_O$−1. Here, $N_O$ is a length of the Chu sequence and is an odd number. β as a root index means a parameter for separating the ID of the transmission training beam, and b corresponds to the root index. $N_{ID}$ indicates total number of the root index. s indicates a parameter for separating the ID of the cell from the ID of the training sub array by cyclic-shifting the Chu sequence, and s=n+$aA_{ST}$.

$N_{ID}$ is the total number of the ID of the cell, and $A_{ST}$ is total number of the training sub array.

If the 3) embodiment 1 is used, excellent PARR performance may be realized due to characteristics of the Chu sequence, and comparative many IDs of the transmission training beam and the training sub array may be separated. Additionally, it is easy to separate the ID of the transmission training beam in a multi beam and multi user environment.

4) Embodiment 2 of Transmitting the ID Using a Chu Sequence

In one embodiment, the transmission unit 1110 may generate a Chu sequence based on the ID of the transmission training beam and the ID of the training sub array according to following equation 32 to equation 34, and transmit the generated Chu sequence to the receiver 1170.

$$B^o(k) = \begin{cases} e^{j\frac{\pi\alpha k(k+1)}{N_C}}_{k=0,1,\ldots,N_C-1}, & gcd(\alpha, N_C) = 1 \\ 0 & \text{otherwise} \end{cases} \quad \text{[Equation 32]}$$

$$\beta^o(n) = \frac{1}{N}\sum_{k=0}^{N-1} B^o(k)e^{-j\frac{2\pi nk}{N}} \quad \text{[Equation 33]}$$

$$\beta_s^0(n) = \beta_a(n + N_b(s-1))_{mod\ N} \quad \text{[Equation 34]}$$

In equations 32 to 34, $\beta_s^q(n)$ means a Chu sequence transmitted to the receiver 1170. k indicates an index of a subcarrier, and $N_O$ is a length of the Chu sequence and is an odd number. α as a root index is a parameter for separating the ID of the cell. q corresponds to the root index and $N_{ID}$ is total number of the ID of the cell. $N_b$ indicates an interval for searching a beam, and the ID of the transmission training beam and the ID of the training sub array corresponding to the interval are detected in the event that high correlation value is obtained in the interval while the searching is performed. s is a parameter for separating intervals for searching the beam by a number of the ID of the transmission training beam and a number of the ID of the training sub array. $B_{ID}$ means total number of the transmission beam, and $A_{ST}$ indicates total number of the training sub array. Here, $N_b$ may be determined so that $$\frac{N}{N_b}$$

becomes always a natural number higher than 1. N means a number of the subcarrier or magnitude of FFT.

If 3) embodiment 1 is used, the beam training is performed in time domain. Accordingly, complexity of the beam training is low and the beam training is not nearly affected by a channel because Fourier transform is not performed. Furthermore, the beam training may not be affected by a timing offset although the timing offset is smaller than a circular prefix CP.

5) Embodiment 1 of Transmitting the ID Using Spreading

In one embodiment, the transmission unit 1110 may generate a spreading sequence by spreading a first Chu sequence generated based on the ID of the transmission training beam and the ID of the training sub array using a second Chu sequence according to equation 35 to equation 39, and transmit the generated spreading sequence to the receiver 1170.

$$B^q(m) = e^{j\frac{\pi \alpha m(m+1)}{N_b}}, \; gcd(\alpha, N_b) = 1 \quad \text{[Equation 35]}$$

$$C^\rho(l) = e^{j\frac{\pi \rho l(l+1)}{N_L}}, \; gcd(\rho, N_L) = 1 \quad \text{[Equation 36]}$$

$$B_i^q(m) = B^q(m+i)_{mod N_b} \quad \text{[Equation 37]}$$

$$C_\nu^\rho(l) = C^\rho(l+\nu)_{mod N_L} \quad \text{[Equation 38]}$$

$$S_{i,\nu}^{q,\rho}(k) = B_i^q(\lfloor k/N_L \rfloor)C_\nu^\rho(k)_{mod N_\nu} \quad \text{[Equation 39]}$$

In equation 35 to equation 39, $B^q(m)$ means a beam sequence for separating the ID of the training sub array and is generated by using a Chu sequence having a length of $N_b'$. α and q are parameters corresponding to the root index. $N_\alpha$ indicates total number of the root index. i is a parameter for cyclic-shifting an order of the beam sequence and may separate the ID of the transmission training beam and the ID of the training sub array using combination of q,i. C as the spreading sequence is generated by using the Chu sequence having a length of $N_L$. ρ means the root index and p is a parameter corresponding to the root index. $N_\rho$ is total number of the root index. ν is a parameter of cyclic-shifting the spreading sequence and may separate the ID of the cell using combination of p, ν.

If 5) embodiment 1 is used, the beam sequence and the spreading sequence are generated by using m sequence so that their relation corresponds to relation of small aggregation of Kasami sequence.

6) Embodiment 2 of Transmitting the ID Using Spreading

In one embodiment, the transmission unit 1110 generates a spreading sequence by spreading a first m sequence generated based on the ID of the transmission training beam and the ID of the training sub array using a second m sequence according equation 40 to equation 42. The transmission unit 1110 may transmit the generated spreading sequence to the receiver 1170.

$$B_s(m)=B(m+s)_{mod N_s} \quad \text{[Equation 40]}$$

$$C_\nu(k)=C(k+\nu)_{mod N} \quad \text{[Equation 41]}$$

$$S_{b,\nu}(k)=B_s(\lfloor k/(N_b+2)\rfloor)C_\nu(k) \quad \text{[Equation 42]}$$

In equation 40 to equation 42, B as an m sequence having a length of $N_s$ indicates a beam sequence. Here, values of sequences are sequentially mapped in a unit of $N/N_s$ number. s means a parameter for cyclic-shifting the beam sequence, separate the ID of the transmission training beam from the ID of the training sub array, and are realized with combination of a and b, e.g. $s=aA_{ST}+b$. Here a=0, 1, . . . , $A_{ST}-1$, and b=0, 1, . . . , $B_{ID}-1$. $A_{ST}$ indicates a number of the training sub array, and $B_{ID}$ means a number of the transmission beam. C as a spreading sequence having information concerning the ID of the cell is an m sequence having a length of N. V separates the ID of the cell by cyclic-shifting the spreading sequence.

If 6) embodiment 2 is used, complexity is low and diversity gain may be obtained because the same values are mapped.

In the above embodiments, the transmission unit 1110 may transmit the symbol including information concerning the ID of the transmission training beam and information concerning the training sub array to the receiver 1170. In this case, the receiver 1170 may detect the symbol on the physical layer and decode the ID of the transmission training beam and the ID of the training sub array on the physical layer.

Figure 12:
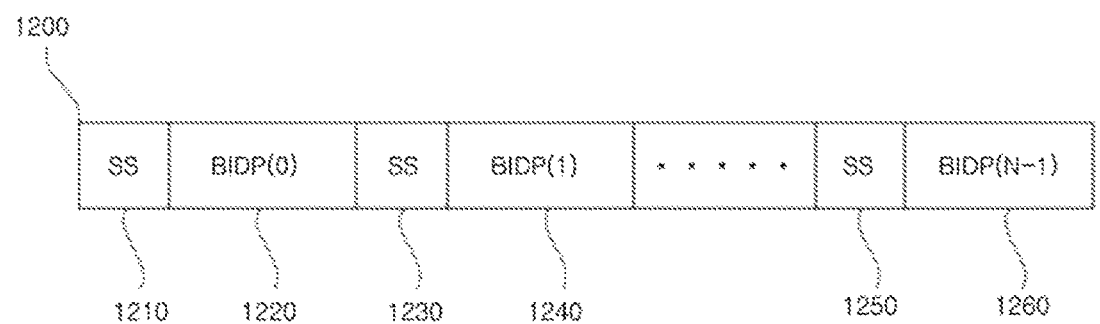
FIG. 12 is a view illustrating a frame transmitted from the transmitter to the receiver according to one embodiment of the invention.

FIG. 12 is a view illustrating a frame transmitted from the transmitter to the receiver according to one embodiment of the invention.

In one embodiment, a transmitter may use only ID of one training sub array during specific time interval and perform a beam training with changing transmission training beams. That is, in the event that the transmitter can form N transmission beams, the transmitter may form one by one the N transmission beams and perform N switching for the N transmission beams.

In this case, the transmitter may perform the beam training by transmitting a frame 1200 shown in FIG. 12 to a receiver. The frame 1200 may include synchronization signals SS 1210, 1230 and 1250 and beam ID preambles BIDP 1220, 1240 and 1260. Each of the BIDPs 1220, 1240 and 1260 includes information concerning an ID of a transmission training beam corresponding to numeral.

The receiver may receive the BIDPs 1220, 1240 and 1260 included in the frame 1200, and detect the ID of the transmission training beam used for transmitting the BIDPs 1220, 1240 and 1260 and a training sub array. The receiver may perform effectively the beam training using the detected ID of the transmission training beam and the training sub array.

Figure 13:
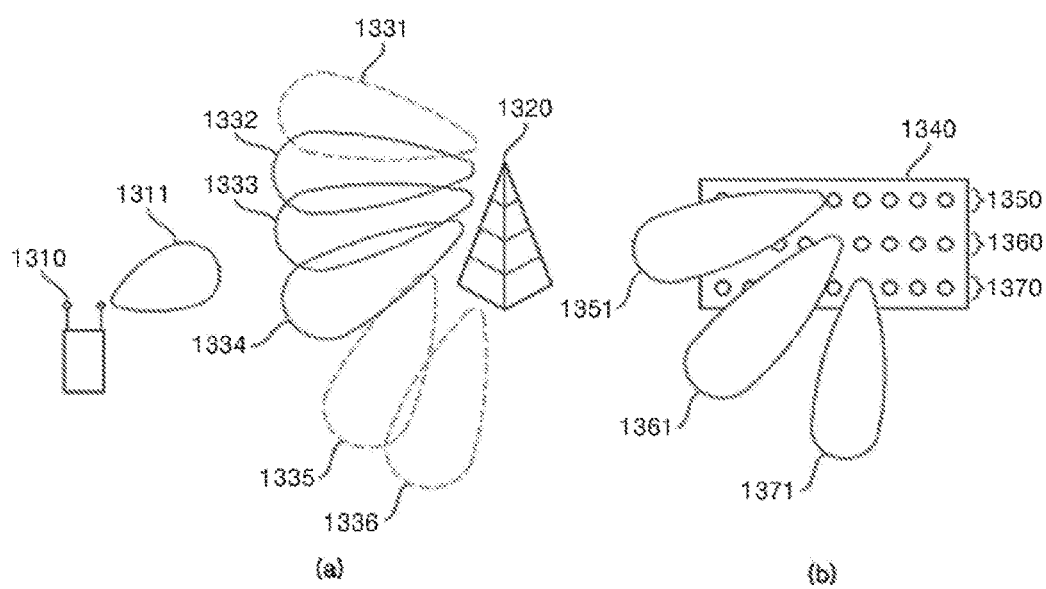
FIG. 13 is a view illustrating an example of selecting a transmission training beam in a downlink.

FIG. 13 is a view illustrating an example of selecting a transmission training beam in a downlink.

(a) in FIG. 13 shows an embodiment where a transmitter 1320 transmits information concerning M transmission training beams using simultaneously the M transmission training beams, wherein the transmitter 1320 can form N transmission beams 1331, 1332, 1333, 1334, 1335 and 1336 using a transmission array 1340.

(b) in FIG. 13 illustrates the transmission array 1340 of the transmitter 1320. The transmission array 1340 includes M sub arrays 1350, 1360 and 1370. The transmitter 1320 form M transmission training beams 1351, 1361 and 1371 which are respectively formed by sub arrays 1350, 1360 and 1370. In one embodiment, the transmission training beams 1332, 1333 and 1334 formed by the transmitter 1320 may be beams adjacent with one another.

Figure 14:
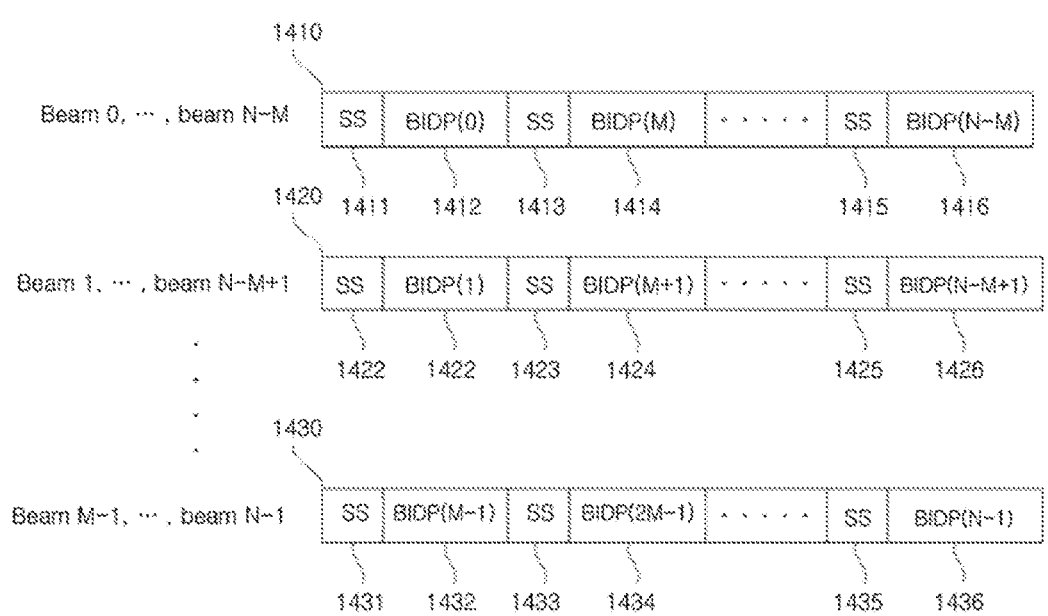
FIG. 14 is a view illustrating a frame transmitted from a transmitter to a receiver according to another embodiment of the invention.

The transmitter 1320 may transmit IDs of the M transmission training beams 1332, 1333 and 1334 to a receiver 1310 by using frames shown in FIG. 14. The receiver 1310 may receive the IDs of the transmission training beams 1332, 1333 and 1334 using a receiving beam 1311, and perform the beam training using the received IDs.

FIG. 14 is a view illustrating a frame transmitted from a transmitter to a receiver according to another embodiment of the invention.

Each of frames 1410, 1420 and 1430 includes synchronization signals 1411, 1413, 1415, 1421, 1423, 1425, 1431, 1433 and 1435 and BIDPs 1412, 1414, 1416, 1422, 1424, 1426, 1432, 1434 and 1436. Referring to FIG. 14, a transmitter transmits an ID '0' of a transmission training beam using a transmission beam '0' selected as a transmission training beam thereby, transmits an ID '1' of a transmission training beam using a transmission beam '1' selected as a transmission training beam thereby, and transmits an ID 'M−1' of a transmission training beam using a transmission beam 'M−1' selected as a transmission training beam thereby. Here, the transmission beams '0' to 'M−1' may be simultaneously transmitted. Each of the BIDPs 1412, 1414 and 1416 may include an ID of a training sub array.

Moreover, the transmitter transmits an ID 'M' of a transmission training beam using a transmission beam 'M' selected as a transmission training beam thereby, transmits an ID 'M+1' of a transmission training beam using a transmission beam 'M+1' selected as a transmission training beam thereby, and transmits an ID '2M−1' of a transmission training beam using a transmission beam '2M−1' selected as a transmission training beam thereby.

If the frame shown in FIG. 14 is used, the transmitter transmits the IDs of the M transmission training beams to the receiver at specific time. Accordingly, a beam training may be completed by using only N/M switching.

Figure 15:
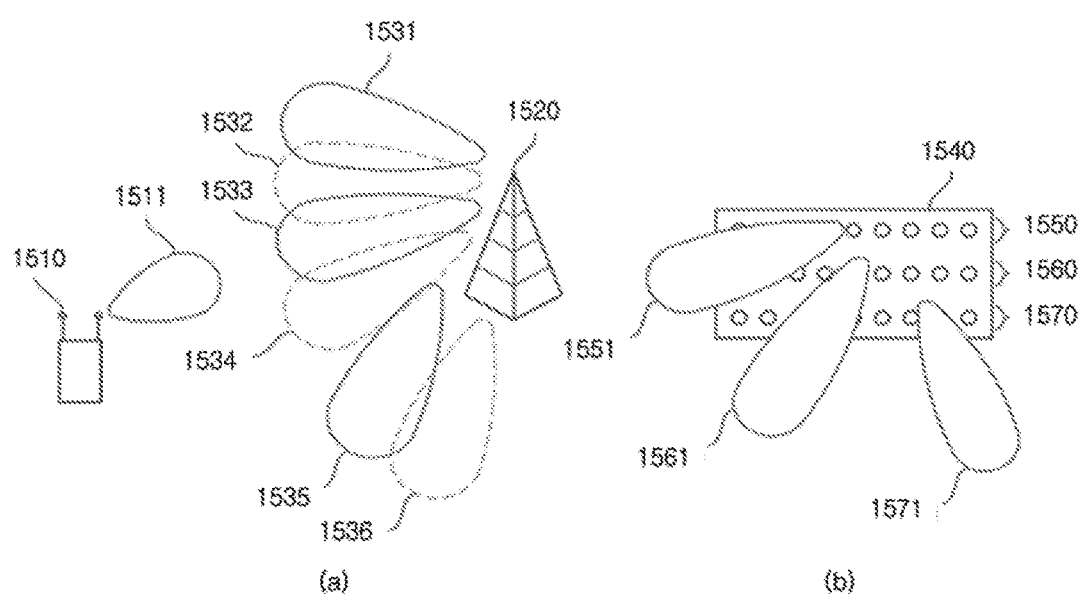
FIG. 15 is a view illustrating another example of selecting transmission training beams.

FIG. 15 is a view illustrating another example of selecting transmission training beams.

(a) in FIG. 15 shows an embodiment where a transmitter 1520 transmits information concerning M transmission training beams using simultaneously the M transmission training beams, wherein the transmitter 1520 can form N transmission beams 1531, 1532, 1533, 1534, 1535 and 1536 using a transmission array 1540.

The embodiment in FIG. 15 is similar to that in FIG. 13. However, the transmitter 1520 may select transmission beams not adjacent with one another as the transmission training beams 1531, 1533 and 1535 and transmit IDs of the transmission training beams 1531, 1533 and 1535 using the selected transmission training beams 1531, 1533 and 1535.

In this case, effect due to side lobes of the transmission training beams 1531, 1533 and 1535 reduces, and thus the beam training may be more accurately performed. The transmitter 1520 in FIG. 15 may transmit the ID of the transmission training beam by using frames shown in FIG. 16.

Figure 16:
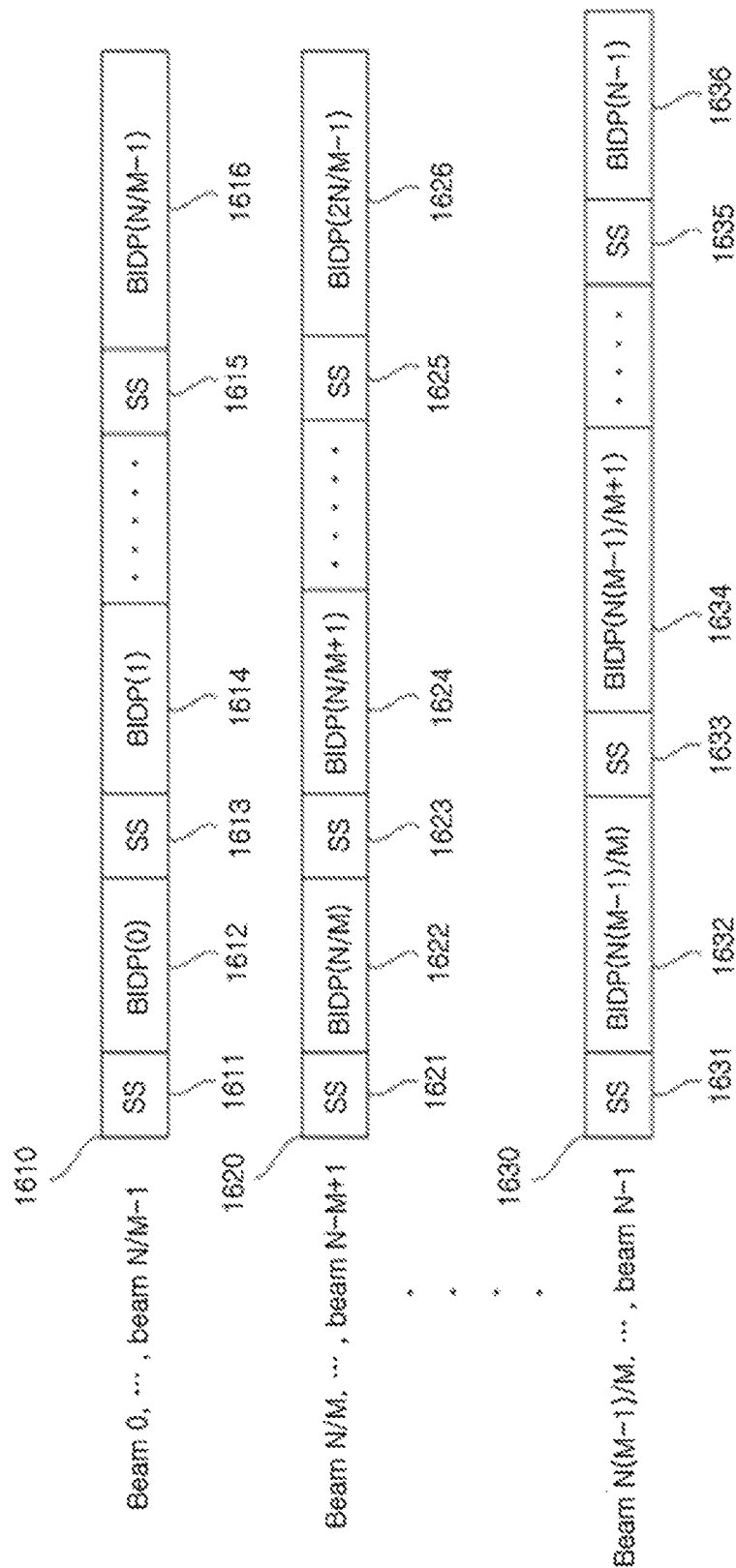
FIG. 16 is a view illustrating a frame transmitted from a transmitter to a receiver according to still another embodiment of the invention.

FIG. 16 is a view illustrating a frame transmitted from a transmitter to a receiver according to still another embodiment of the invention.

Each of frames 1610, 1620 and 1630 includes synchronization signals 1611, 1613, 1615, 1621, 1623, 1625, 1631, 1633 and 1635 and BIDPs 1612, 1614, 1616, 1622, 1624, 1626, 1632, 1634 and 1636. Referring to FIG. 16, a transmitter transmits an ID '0' of a transmission training beam using a transmission beam '0' selected as a transmission training beam thereby, transmits an ID 'N/M'' of a transmission training beam using a transmission beam 'N/M'' selected as a transmission training beam thereby, and transmits an ID 'N(M−1)/M'' of a transmission training beam using a transmission beam 'N(M−1)/M'' selected as a transmission training beam thereby. Here, the transmission beams '0' to 'N(M−1)/M'' may be simultaneously transmitted.

If the frame shown in FIG. 16 is used, the transmitter transmits the IDs of the M transmission training beams, of which directions are not adjacent, to the receiver at specific time. Accordingly, a beam training may be completed by using only N/M switching.

Figure 17:
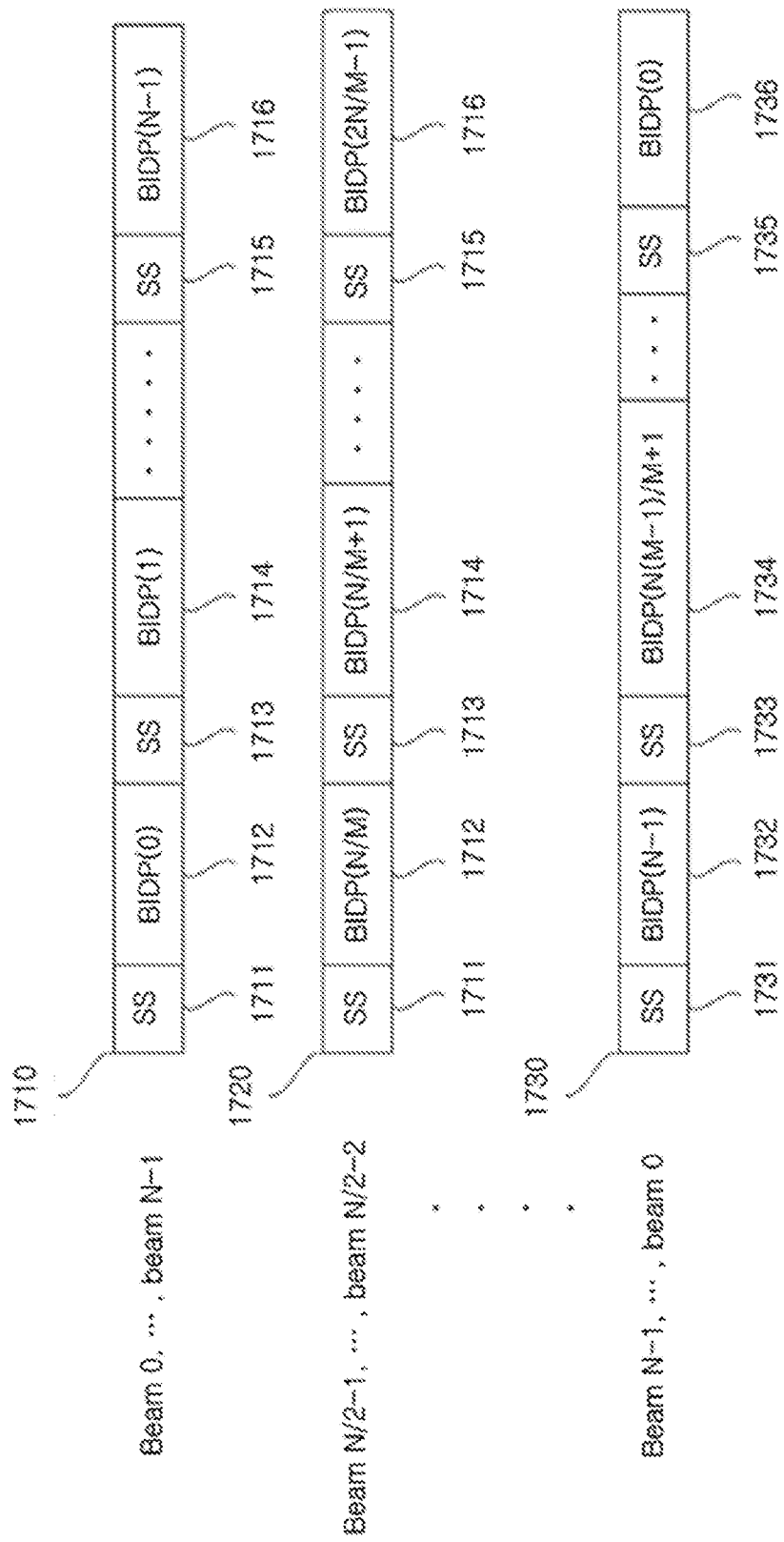
FIG. 17 is a view illustrating a frame transmitted from a transmitter to a receiver according to still another embodiment of the invention.

FIG. 17 is a view illustrating a frame transmitted from a transmitter to a receiver according to still another embodiment of the invention.

Each of frames 1710, 1720 and 1730 includes synchronization signals 1711, 1713, 1715, 1721, 1723, 1725, 1731, 1733 and 1735 and BIDPs 1712, 1714, 1716, 1722, 1724, 1726, 1732, 1734 and 1736.

If the frame in FIG. 17 is used, a transmitter may transmit simultaneously IDs of M transmission training beams through sub arrays, wherein the sub arrays transmit respectively the IDs. Each of the sub arrays may transmit the ID through N switching of the transmission training beam. A time taken for the beam training becomes comparatively long due to the N switching. However, in the event that states of channels between each of the sub arrays and the receiver are individually changed, optimal beam and optimal sub array may be selected.

In FIG. 17, every sub array may switch the transmission training beams with the same order, or switch the transmission training beams with reverse order and so on, i.e. various switching methods may exist.

Figure 18:
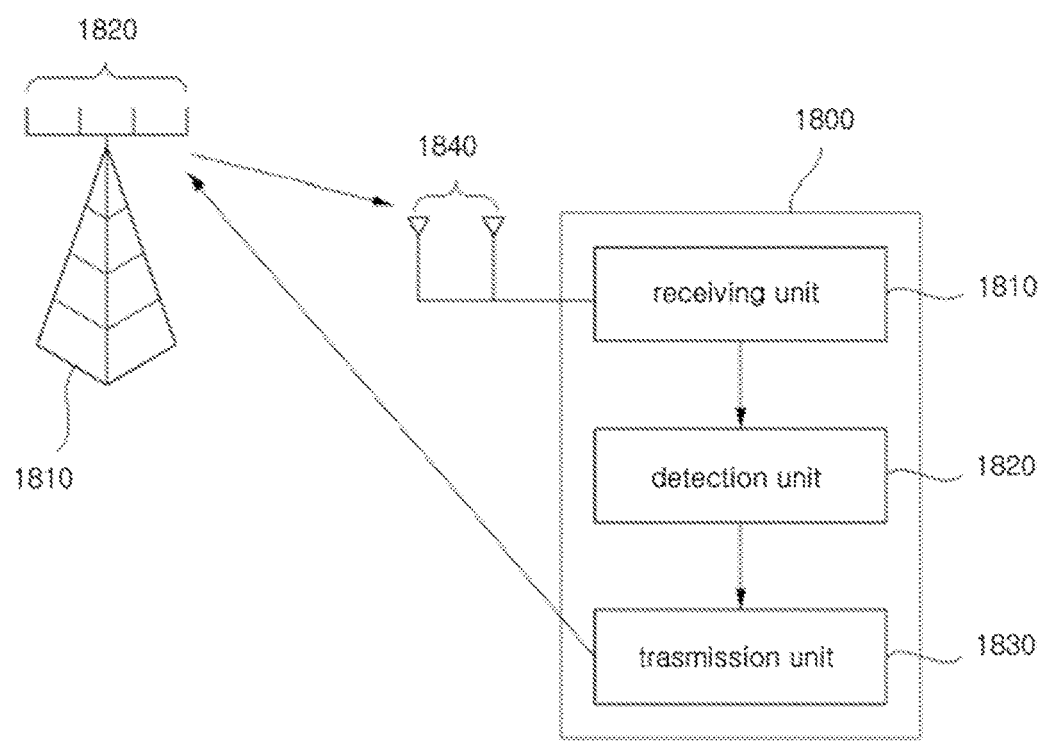
FIG. 18 is a block diagram illustrating a receiver according to one embodiment of the invention.

FIG. 18 is a block diagram illustrating a receiver according to one embodiment of the invention.

A receiver 1800 includes a receiving unit 1810, a detection unit 1820 and a transmission unit 1830.

A transmitter 1810 transmits an ID of a transmission training beam and an ID of a training sub array using a transmission array 1820. The receiving unit 1810 receives the ID of the transmission training beam and the ID of the training sub array using a receiving array 1840.

In one embodiment, the ID of the transmission training beam and the ID of the training sub array may be transmitted depending on various embodiments as described in FIG. 2.

The detection unit 1820 detects the ID of the transmission training beam and the ID of the training sub array transmitted according to the embodiments.

Hereinafter, embodiments for detecting the ID of the transmission training beam and the ID of the training sub array through the detection unit 1820 will be described depending on the embodiments for transmitting the ID of the transmission training beam and the ID of the training sub array.

1) Embodiment 1 where the ID is Transmitted Using a Gold Sequence

In the event that the receiving unit 1810 receives the gold sequence generated based on the ID of the transmission training beam and the ID of the training sub array, the detection unit 1820 may detect simultaneously an ID of a cell, the ID of the transmission training beam and the ID of the training sub array in frequency domain according to following equation 43.

$$[\hat{n}, \hat{s}] = \underset{n}{\operatorname{argmax}}\left\{\underset{s}{\operatorname{argmax}}\left\{\left|\sum_{k=0}^{N-1} Y(k)B_n^s(k)\right|^2\right\}\right\} \quad \text{[Equation 43]}$$

$$[\hat{a}] = \lfloor \hat{s}/B_{ID} \rfloor$$

$$[\hat{b}] = \hat{s}_{modB_{ID}}$$

Here, Y is a receiving signal and k indicates an index of a subcarrier. n means the ID of the cell, and s as a parameter including a and b indicates the ID of respective training sub array and the ID of the transmission training beam.

2) Embodiment 2 where the ID is Transmitted Using a Gold Sequence

In the event that the receiving unit 1810 receives the gold sequence which is generated based on the ID of the transmission training beam and is mapped with certain interval in frequency domain according to the ID of the training sub array, the detection unit 1820 may detect the ID of the cell, the ID of the transmission training beam and the ID of the training sub array in frequency domain according to following equation 44. The detection unit 1820 may detect the IDs after it performs sampling relative to the ID of the training sub array in frequency domain.

$$[\hat{n}, \hat{a}, \hat{b}] = \underset{n}{\operatorname{argmax}}\left\{\underset{b}{\operatorname{argmax}}\left\{\left|\sum_{k=0}^{N_s-1} Y(mA_{sr}+a)B_n^b(m)\right|^2\right\}\right\} \quad \text{[Equation 44]}$$

Here, Y is a receiving signal, and m means an index of sampled subcarrier. $A_{ST}$ indicates a number of the training sub array, and a means the ID of the training sub array. n indicates the ID of the cell, and b means the ID of the transmission training beam.

3) Embodiment 1 where the ID is Transmitted Using a Chu Sequence

In the event that the receiving unit 1810 receives a Chu sequence which is generated based on the ID of the transmission training beam and is cyclic-shifted in frequency domain according to the ID of the training sub array, the detection unit 1820 may detect the ID of the transmission training beam and the ID of the training sub array according to following equation 45.

$$[\hat{s}, \hat{b}] = \underset{s}{\operatorname{argmax}}\left\{\underset{b}{\operatorname{argmax}}\left\{\left|\sum_{k=0}^{N-1} Y(k)B_s^b(k)\right|^2\right\}\right\} \quad \text{[Equation 45]}$$

$$[\hat{n}] = \hat{s}_{modN_{ID}}$$

$$[\hat{a}] = \lfloor \hat{s}/N_{ID} \rfloor$$

Here, Y is a receiving signal, and k means an index of a subcarrier. b is a parameter indicating the ID of the transmission training beam, and s is expressed as combination of n and a. n and a are parameters for separating the ID of the cell and the ID of the training sub array, respectively 4) Embodiment 2 where the ID is Transmitted Using a Chu Sequence In the event that the receiving unit 1810 receives the Chu sequence generated based on the ID of the transmission training beam and the ID of the training sub array, the detection unit 1820 may detect the ID of the transmission training beam and the ID of the training sub array according to following equation 46.

$$[\hat{q}, \hat{l}] = \underset{q}{\operatorname{argmax}}\left\{\underset{s}{\operatorname{argmax}}\left\{\sum_{n=0}^{N-1} y(n)\beta^q(n+l)^*_{modN}\right\}\right\} \quad \text{[Equation 46]}$$

$$[\hat{s}] = \lfloor l/N_b \rfloor$$

$$[\hat{a}] = \lfloor \hat{s}/B_{ID} \rfloor$$

$$[\hat{b}] = \hat{s}_{modB_{ID}}$$

Here, y means a receiving signal in time domain, n indicates a sampling index, and l is an index having high correlation value in time domain. q means indicates a root index corresponding to the ID of the cell, and $N_{ID}$ is total number of the root index. s as a parameter including a and b indicates a parameter for cyclic-shifting a signal with $N_b$ times. a and b mean respectively the ID of the transmission training beam and the ID of the training sub array, and $N_b$ indicates interval length of the ID of the transmission training beam and the ID of the training sub array.

5) Embodiment 1 where the ID is Transmitted Using Spreading

In the event that the receiving unit 1810 receives a spreading sequence generated by spreading a first Chu sequence generated based on the ID of the transmission training beam and the ID of the training sub array using a second Chu sequence, the detection unit 1820 may detect the ID of the transmission training beam and the ID of the training sub array according to following equation 47.

$$[\hat{B}_v^p(m)] = \sum_{l=0}^{N_s-1} Y(l+mN_L)C_v^p(l)^* \quad \text{[Equation 47]}$$

$$[\hat{q}, \hat{i}, \hat{p}, \hat{v}] = \underset{p,v}{\operatorname{argmax}}\left\{\underset{q,i}{\operatorname{argmax}}\left|\sum_{m=0}^{N_b-1} \hat{B}_v^p(m)B^q(m+i)^*_{modN_b}\right|^2\right\}$$

Here, Y is a receiving signal in frequency domain, and l means an index of a subcarrier corresponding to a length of the spreading sequence. $N_L$ is a length of the spreading sequence, and m is an index of a beam sequence. $N_L$ are parameters corresponding to the ID of the cell, and $\hat{B}$ is a beam sequence restored through inverse spreading. $N_b$ means a length of the beam sequence, q is a parameter corresponding to a root index of the beam sequence, and i is a parameter for cyclic-shifting the beam sequence. The detection unit 1820 may detect the ID of the transmission training beam and the ID of the training sub array through combination of q and i.

6) Embodiment 2 where the ID is Transmitted Using Spreading

In the event that the receiving unit 1810 receives the spreading sequence generated by spreading a first m sequence generated based on the ID of the transmission training beam and the ID of the training sub array using a second m sequence, the detection unit 1820 may detect the ID of the transmission training beam and the ID of the training sub array according to following equation 48.

$$\hat{\beta}^v(k) + Y(k)C_v(k)$$ [Equation 48]

$$\hat{B}^v(m) = \hat{\beta}^v(mN_s + i),$$

$$i = 0, 1, \ldots, N_s - 1$$

Here, Y is a receiving signal in frequency domain, and k means an index of a subcarrier. C is an inverse spreading sequence, and v is a parameter indicating the ID of the cell. β is an inverse-spreading symbol, and $N_s$ is a length of a beam sequence. $\hat{B}$ indicates an estimated beam sequence estimated sampled with interval of $N_b$, and s realized with combination of a and b is a parameter for separating the ID of the transmission training beam from the ID of the training sub array. a and b are the ID of the transmission training beam and the ID of the training sub array, respectively.

In one embodiment, the detection unit 1820 may perform the beam training by using the detected IDs of the transmission training beam and the training sub array.

The transmission unit 1830 may transmit information concerning a data transmission beam determined according to the beam training to the transmitter 1810. The transmitter 1810 may transmit data using the data transmission beam, and the receiving unit 1820 may receive the data transmitted by using the data transmission beam through a data receiving beam.

Hereinafter, an embodiment of applying the invention to the uplink of the mobile communication system will be described in detail with reference to accompanying drawings FIG. 19 to FIG. 22. Here, a base station in the mobile communication system may operate as a receiver, and a terminal in the mobile communication system may operate as a transmitter.

Figure 19:
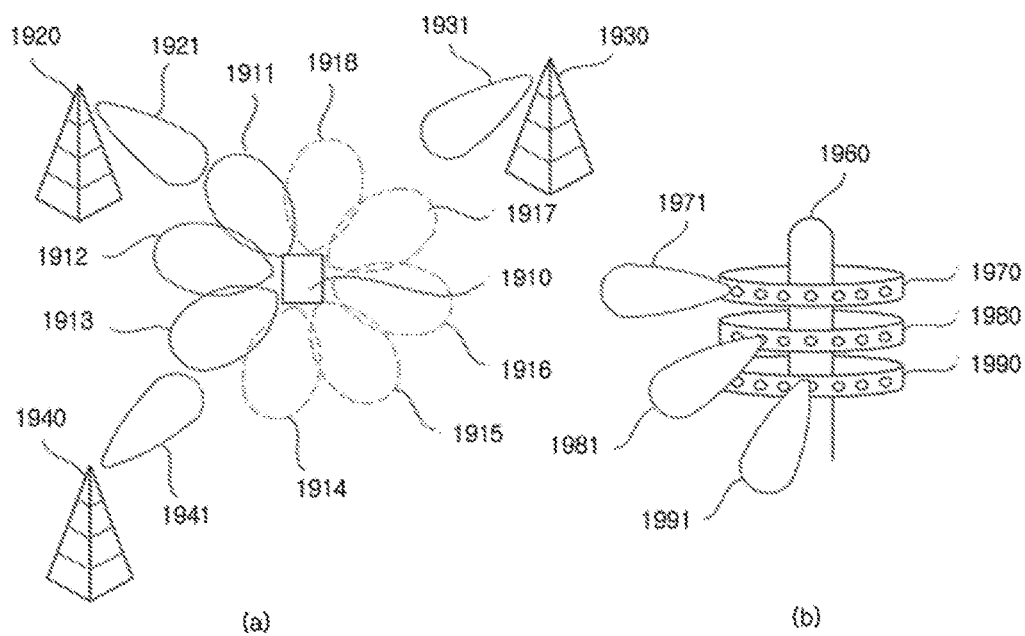
FIG. 19 is a view illustrating an example of selecting a transmission training beam in uplink.

FIG. 19 is a view illustrating an example of selecting a transmission training beam in uplink.

(a) in FIG. 19 shows an embodiment where a transmitter 1910 transmits information concerning M transmission training beams using simultaneously the M transmission training beams, wherein the transmitter 1910 can form N transmission beams 1911, 1912, 1913, 1914, 1915, 1916, 1917 and 1918 using a transmission array 1960.

(b) in FIG. 19 illustrates the transmission array 1960 of the transmitter 1910. The transmission array 1960 includes M sub arrays 1970, 1980 and 1990. The transmitter 1910 form M transmission training beams 1971, 1981 and 1991 which are respectively formed by sub arrays 1970, 1980 and 1990. In one embodiment, the transmission training beams 1911, 1912 and 1913 formed by the transmitter 1910 may be beams adjacent with one another.

Figure 20:
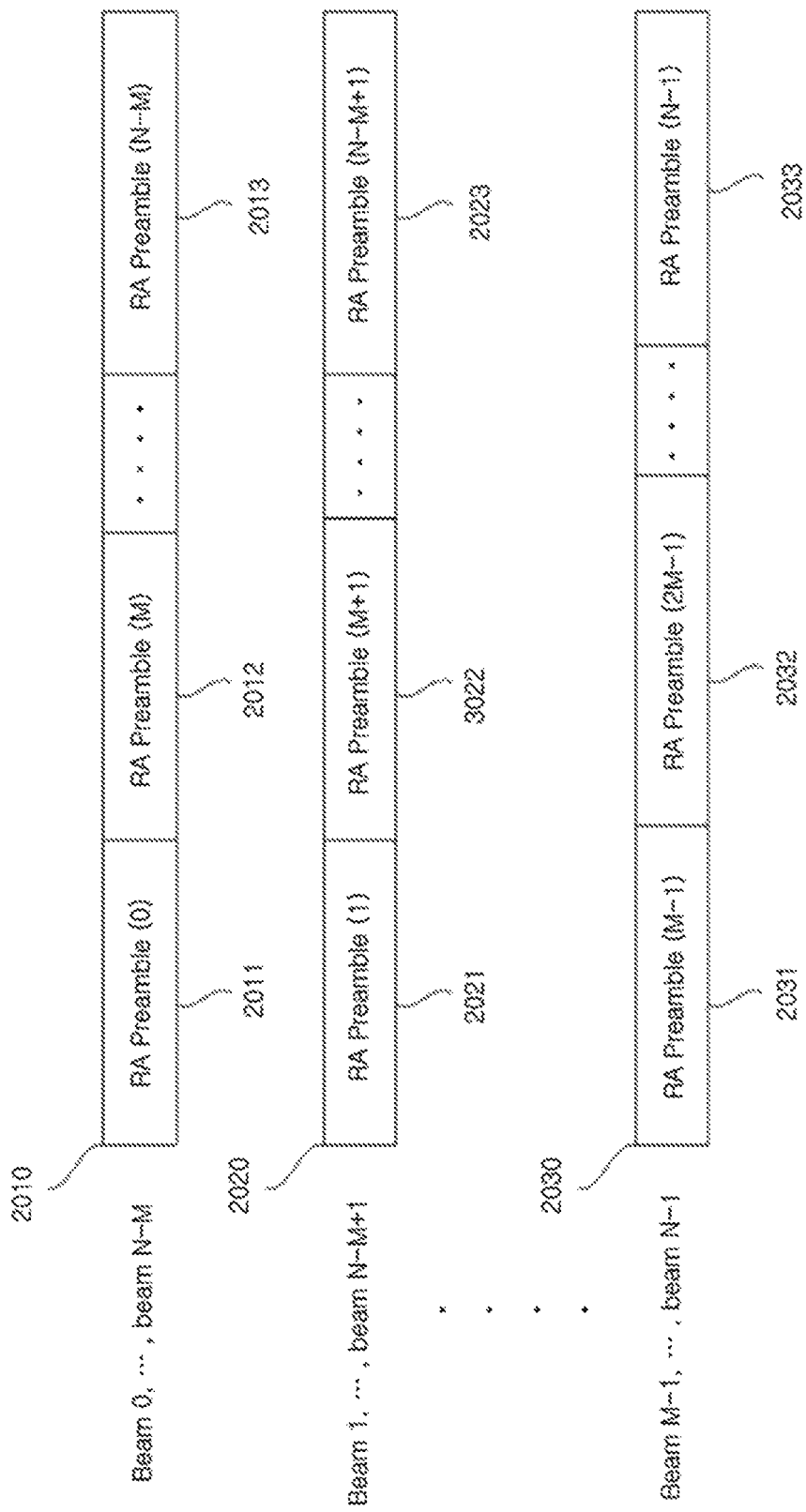
FIG. 20 is a view illustrating a frame transmitted from a transmitter to a receiver according to still another embodiment of the invention.

The transmitter 1910 may transmit IDs of the M transmission training beams 1911, 1912 and 1913 to receivers 1920, 1930 and 1940 by using frames shown in FIG. 20. The receivers 1920, 1930 and 1940 may receive the IDs of the transmission training beams 1911, 1912 and 1913 using receiving beams 1921, 1931 and 1941.

In one embodiment, the receivers 1920, 1930 and 1940 may be connected with one another by using a backbone network. Accordingly, though any receiver receives the ID, every receiver 1920, 1930 and 1940 may share the ID and determine optimal data transmission beam and optima data receiving beam using the shared ID.

FIG. 20 is a view illustrating a frame transmitted from a transmitter to a receiver according to still another embodiment of the invention.

Frames 2010, 2020 and 2030 include random access preambles 2011, 2012, 2013, 2021, 2022, 2023, 2031, 2032 and 2033. Each of the random access preambles 2011, 2012, 2013, 2021, 2022, 2023, 2031, 2032 and 2033 may include an ID of a transmission training beam and an ID of a training sub array corresponding to its numeral.

If the frame shown in FIG. 20 is used, the transmitter transmits the IDs of M transmission training beams to the receiver at specific time. Accordingly, a beam training may be completed through only N/M switching.

Figure 21:
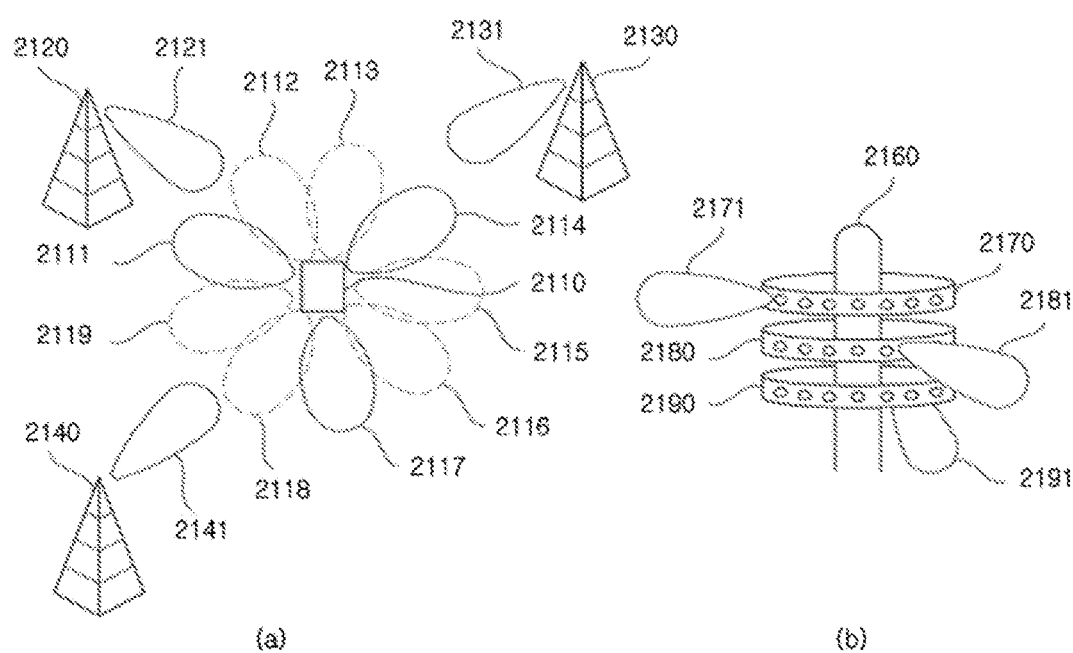
FIG. 21 is a view illustrating another example of selecting a transmission training beam in uplink.

FIG. 21 is a view illustrating another example of selecting a transmission training beam in uplink.

(a) in FIG. 21 shows an embodiment where a transmitter 2110 transmits information concerning M transmission training beams using simultaneously the M transmission training beams, wherein the transmitter 2110 can form N transmission beams 2111, 2112, 2113, 2114, 2115, 2116, 2117, 2118 and 2119 using a transmission array 2160.

(b) in FIG. 21 illustrates the transmission array 2160 of the transmitter 2110. The transmission array 2160 includes M sub arrays 2170, 2180 and 2190. The transmitter 2110 form M transmission training beams 2171, 2181 and 2191 which are respectively formed by sub arrays 2170, 2180 and 2190.

The embodiment in FIG. 21 is similar to that in FIG. 19. However, the transmitter 2110 may select transmission beams not adjacent with one another as the transmission training beams 2111, 2114 and 2117 and transmit IDs of the transmission training beams 2111, 2114 and 2117 using the selected transmission training beams 2111, 2114 and 2117.

In this case, effect due to side lobes of the transmission training beams 2111, 2114 and 2117 reduces, and thus the beam training may be more accurately performed. The transmitter 1520 in FIG. 21 may transmit the ID of the transmission training beam by using frames shown in FIG. 22.

Figure 22:
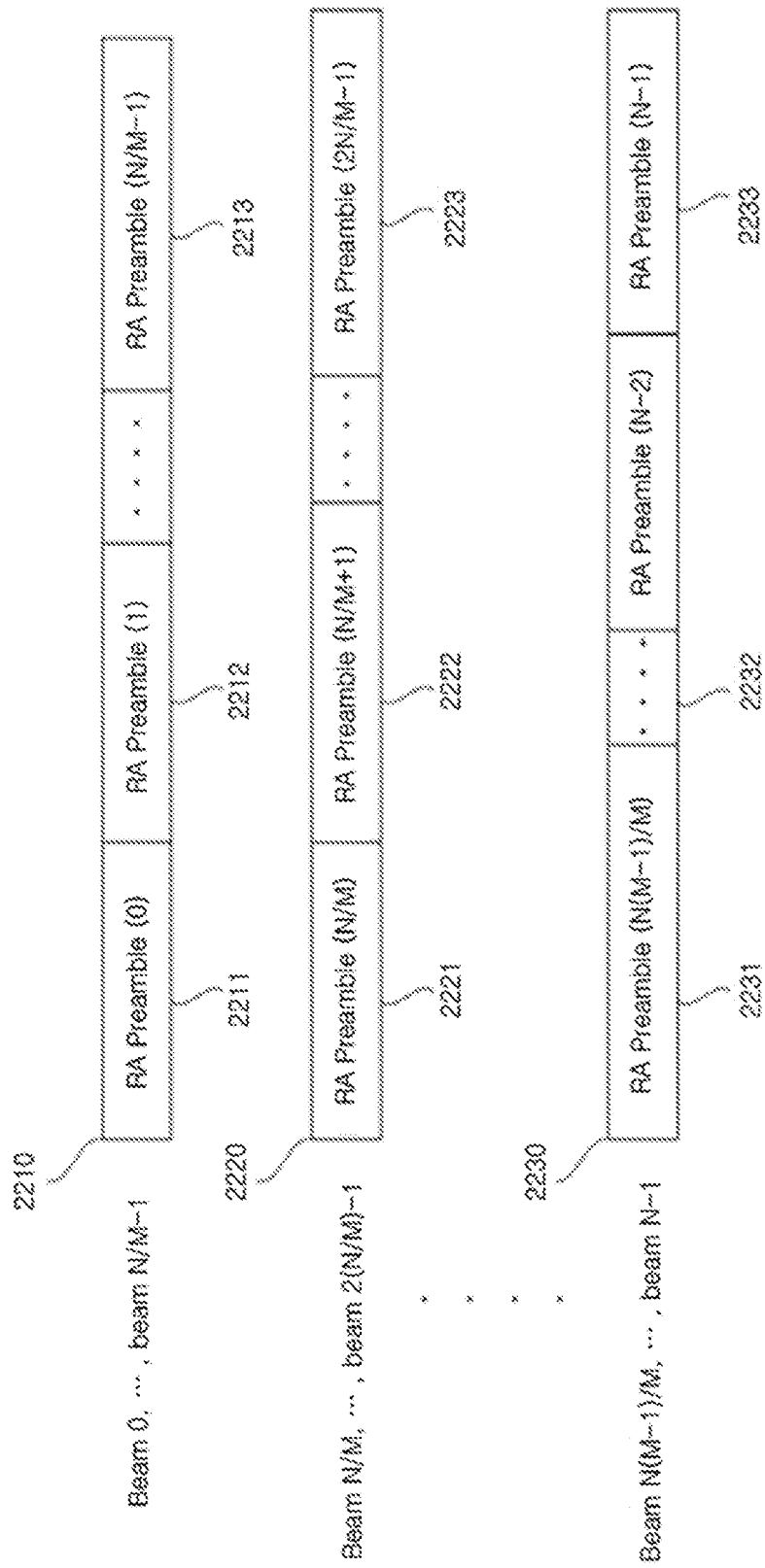
FIG. 22 is a view illustrating a frame transmitted from a transmitter to a receiver according to still another embodiment of the invention.

FIG. 22 is a view illustrating a frame transmitted from a transmitter to a receiver according to still another embodiment of the invention.

Frames 2210, 2220 and 2230 include random access preambles 2211, 2212, 2213, 2221, 2222, 2223, 2231, 2232 and 2233. Each of the random access preambles 2211, 2212, 2213, 2221, 2222, 2223, 2231, 2232 and 2233 may include an ID of a transmission training beam and an ID of a training sub array corresponding to its numeral.

If the frame shown in FIG. 22 is used, the transmitter transmits the IDs of M transmission training beams to the receiver at specific time. Accordingly, a beam training may be completed through only N/M switching. Additionally, since the transmission beams not adjacent with one another are selected as the transmission training beam, effect due to side lobes of the transmission training beams reduces, and thus a beam training may be more accurately performed.

Also, the technical features described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below. For example, described techniques may be performed in different order from described methods, and/or elements such as above a system, a structure, a device, a circuit, etc. may be combined in different type in method mentioned above, or desired result may be achieved although the elements are replaced with other elements or equal elements.

Accordingly, equality of other embodiments and claims are included in the scope of claims set forth below.

DESCRIPTION OF REFERENCE NUMBERS

110: transmitter
120: transmission array
131, 132, 133, 134: transmission beam
140: receiver
150: transmission array
161, 162, 163: receiving beam

The invention claimed is:

1. A method for beam training performed in a mobile communication system including a transmitter and a receiver, the method comprising:
   (a) selecting, by the transmitter, at least one transmission training beam among transmission beams formed by a transmission array in the transmitter;
   (b) modulating, by the transmitter, a transmission signal according to an identifier ID of the at least one transmission training beam;
   (c) transmitting, by the transmitter, the modulated transmission signal to the receiver on a physical layer using the at least one transmission training beam;
   (d) selecting, by the receiver, at least one receiving training beam among receiving beams formed by a receiving array in the receiver;
   (e) receiving, by the receiver, the modulated transmission signal using the at least one receiving training beam; and
   (f) performing synchronization process and beam training process of the transmitter and the receiver simultaneously using the modulated transmission signal,
   wherein, each of frames of the transmission signal includes a primary synchronization signal PSS, a secondary synchronization signal SSS, and a common reference signal CRS, and
   wherein, in step (f), the receiver synchronizes with the transmitter using the PSS, estimates a channel between the transmitter and the receiver using the PSS, and obtains a modulated value of the phase of the SSS or the CRS using the estimated channel and detects the ID of the transmission training beam from the modulated value.

2. The method of claim 1, wherein the ID of the at least one transmission training beam is used for selecting a pair of beams, the pair of beams includes a data receiving beam for receiving data from the transmitter among the receiving beams and a data transmission beam for transmitting data from the transmitter to the receiver among the transmission beams.

3. The method of claim 1, wherein, in step (c), the transmitter transmits simultaneously the modulated transmission signal including the ID of each transmission training beam using a plurality of transmission training beams.

4. The method of claim 3, wherein the transmission beams are aligned in a direction where gain is maximum, and transmission beams not adjacent with each other are selected as the at least one transmission training beam from the aligned transmission beams.

5. The method of claim 1, further comprising:
   (g) receiving, by the transmitter, a channel state information generated by the receiver; and
   (h) determining, by the transmitter, whether or not the transmitter is to transmit data to the receiver using the at least one transmission training beam according to the channel state information.

6. The method of claim 3, wherein the channel state information is a signal to noise ratio SNR or a signal to interference and noise ratio SINR.

7. The method of claim 1, wherein, in step (f), the receiver measures a receiving power of the modulated transmission signal, and detects the ID of the at least one transmission training beam corresponding to a modulated transmission signal of which the receiving power is more than a critical value.

8. The method of claim 1, further comprising:
   (i) receiving, by the receiver, receiving signals transmitted from the transmitter using data transmission beams selected from the at least one transmission training beam;
   (j) combining, by the receiver, the received receiving signals; and
   (k) detecting, by the receiver, data from the combined receiving signals.

9. The method of claim 1, further comprising:
   (l) receiving, by the receiver, first data from the transmitter using a first data transmission beam selected from the at least one transmission training beam; and
   (m) receiving, by the receiver, second data from the transmitter using a second data transmission beam selected from the at least one transmission training beam.

10. A method for beam training performed in a mobile communication system including a transmitter and a receiver wherein the transmitter includes a two dimensional transmission array having one dimensional sub arrays, the method comprising:
    (a) selecting, by the transmitter, a training sub array among the one dimensional sub arrays;
    (b) selecting, by the transmitter, a transmission training beam among transmission beams formed by the training sub array;
    (c) generating, by the transmitter, a sequence based on an identifier ID of the transmission training beam and an ID of the training sub array;
    (d) transmitting, by the transmitter, a transmission signal including the sequence to the receiver on a physical layer using the transmission training beam;
    (e) detecting, by the receiver, the ID of the transmission training beam and the ID of the training sub array using the sequence in the transmission signal; and
    (f) performing, by the receiver, beam training process using the detected ID of the transmission training beam and the detected ID of the training sub array, wherein the ID of the transmission training beam and the ID of the training sub array are used for selecting a pair of beams, the pair of beams includes a data transmission beam, the data transmission beam is a transmission beam used to transmit data from the transmitter to the receiver among transmission beams capable of being formed by using the transmission array, and wherein the sequence includes a gold sequence or a mapped gold sequence, wherein the gold sequence is generated based on the ID of the transmission training beam and the ID of the training sub array, and the mapped gold sequence is generated by mapping a gold sequences generated based on the ID of the transmission training beam to a certain interval in frequency domain according to the ID of the training sub array.

11. A method for training beam performed in a mobile communication system including a transmitter and a receiver wherein the transmitter includes a two dimensional transmission array having one dimensional sub arrays, the method comprising:

(a) selecting, by the transmitter, a training sub array among the one dimensional sub arrays;

(b) selecting, by the transmitter, a transmission training beam among transmission beams formed by the training sub array;

(c) generating, by the transmitter, a sequence based on an identifier ID of the transmission training beam and an ID of the training sub array;

(d) transmitting, by the transmitter, a transmission signal including the sequence to the receiver on a physical layer using the transmission training beam;

(e) detecting, by the receiver, the ID of the transmission training beam and the ID of the training sub array using the sequence in the transmission signal; and (f) performing, by the receiver, beam training process using the detected ID of the transmission training beam and the detected ID of the training sub array, wherein the ID of the transmission training beam and the ID of the training sub array are used for selecting a pair of beams, the pair of beams includes a data transmission beam, the data transmission beam is a transmission beam used to transmit data from the transmitter to the receiver among transmission beams capable of being formed by using the transmission array, and wherein the sequence includes a Chu sequence, a cyclic-shifted Chu sequence, or a spreading sequence, wherein the Chu sequence is generated based on the ID of the transmission training beam and the ID of the training sub array, the cyclic-shifted Chu sequence is generated by cyclically shifting a Chu sequence generated based on the ID of the transmission training beam in frequency domain according to the ID of the training sub array, and the spreading sequence is generated by spreading a first Chu sequence generated based on the ID of the transmission training beam and the ID of the training sub array using a second Chu sequence.

12. A method for training beam performed in a mobile communication system including a transmitter and a receiver wherein the transmitter includes a two dimensional transmission array having one dimensional sub arrays, the method comprising:

(a) selecting, by the transmitter, a training sub array among the one dimensional sub arrays;

(b) selecting, by the transmitter, a transmission training beam among transmission beams formed by the training sub array;

(c) generating, by the transmitter, a sequence based on an identifier ID of the transmission training beam and an ID of the training sub array;

(d) transmitting, by the transmitter, a transmission signal including the sequence to the receiver on a physical layer using the transmission training beam;

(e) detecting, by the receiver, the ID of the transmission training beam and the ID of the training sub array using the sequence in the transmission signal; and (f) performing, by the receiver, beam training process using the detected ID of the transmission training beam and the detected ID of the training sub array, wherein the ID of the transmission training beam and the ID of the training sub array are used for selecting a pair of beams, the pair of beams includes a data transmission beam, the data transmission beam is a transmission beam used to transmit data from the transmitter to the receiver among transmission beams capable of being formed by using the transmission array, and wherein the sequence includes a spreading sequence generated by spreading a first predetermined number m sequence using a second m sequence, and the first m sequence is generated based on the ID of the transmission training beam and the ID of the training sub array.

* * * * *